United States Patent
Polychronakis

(10) Patent No.: US 10,334,684 B2
(45) Date of Patent: Jun. 25, 2019

(54) COMMISSIONING, DECOMMISSIONING AND TESTING OF A SMART SENSOR-DRIVEN LED LIGHTING SYSTEM WITHOUT GATEWAY

(71) Applicant: LEDVANCE GmbH, Garching bei Munchen (DE)

(72) Inventor: Orestis Polychronakis, Munich (DE)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 15/883,419

(22) Filed: Jan. 30, 2018

(65) Prior Publication Data
US 2018/0227998 A1   Aug. 9, 2018

(30) Foreign Application Priority Data

Feb. 3, 2017 (DE) .......................... 10 2017 102 198
Aug. 29, 2017 (EP) ...................................... 17188333

(51) Int. Cl.
| | |
|---|---|
| H05B 37/02 | (2006.01) |
| H05B 33/08 | (2006.01) |
| F21K 9/272 | (2016.01) |
| F21K 9/278 | (2016.01) |
| F21Y 103/10 | (2016.01) |
| F21Y 115/10 | (2016.01) |

(52) U.S. Cl.
CPC ..... *H05B 33/0854* (2013.01); *H05B 33/0884* (2013.01); *H05B 37/0218* (2013.01); *H05B 37/0227* (2013.01); *H05B 37/0272* (2013.01); *F21K 9/272* (2016.08); *F21K 9/278* (2016.08); *F21Y 2103/10* (2016.08); *F21Y 2115/10* (2016.08); *Y02B 20/386* (2013.01); *Y02B 20/46* (2013.01); *Y02B 20/48* (2013.01)

(58) Field of Classification Search
CPC ............ H05B 37/0218; H05B 37/0227; H05B 37/0245; H05B 37/0272
USPC .................................. 315/152, 158, 307, 312
See application file for complete search history.

(56) References Cited

U.S. PATENT DOCUMENTS

| | | | |
|---|---|---|---|
| 2012/0068611 A1* | 3/2012 | Steiner | H05B 37/0227 315/155 |
| 2014/0028199 A1* | 1/2014 | Chemel | H05B 33/0854 315/152 |
| 2014/0265880 A1* | 9/2014 | Taipale | H05B 37/0263 315/158 |
| 2016/0215933 A1* | 7/2016 | Skelton | F21K 9/23 |
| 2016/0302273 A1* | 10/2016 | Wee | H05B 33/0815 |

(Continued)

*Primary Examiner* — Tung X Le
(74) *Attorney, Agent, or Firm* — Hayes Soloway PC

(57) ABSTRACT

The lighting system enables the communication and thereby the creation and/or expansion of a network between a sensor and any number of light sources. The network preferably enables the monitoring and controlling of the light sources by the sensor via a wireless communication. The light source can be an LED lamp, an LED lamp tube, an LED retrofit lamp, preferably a retrofit T8 tube, a fluorescent lamp and/or a halogen lamp. The light source can be a ceiling lamp, a wall lamp, a bottom illumination, direct or indirect lighting, a signal lamp and/or a decorative lighting. The sensor is responsible for creating and/or expanding a wireless network between the sensor and the at least one light source.

6 Claims, 19 Drawing Sheets

(56) References Cited

U.S. PATENT DOCUMENTS

2017/0354022 A1* 12/2017 Dimberg ................ G05B 15/02
2018/0195706 A1* 7/2018 Chemel .............. H05B 37/0227

* cited by examiner

COMMISSIONING, DECOMMISSIONING AND TESTING OF A SMART SENSOR-DRIVEN LED LIGHTING SYSTEM WITHOUT GATEWAY

CROSS-REFERENCE TO RELATED APPLICATIONS AND PRIORITY

This patent application claims the benefit of and priority to German Patent Application No. 102017102198.1 filed on Feb. 3, 2017 and European Patent Application No. 17188333 filed on Aug. 29, 2017, the entire disclosures of which are incorporated herein by reference.

TECHNICAL FIELD

The present invention relates to a lighting system, a light source, a sensor, and a method for creating and/or expanding a wireless network between at least one light source and a sensor. In particular, the invention may relate to commissioning, decommissioning and testing of a smart sensor-driven LED lighting system without an additional gateway.

TECHNICAL BACKGROUND

The system described herein is intended to replace a classical light application (with LED technology or not), as for example found in fairly large rooms or buildings like garages, industrial complexes, storage rooms, offices and indoor or outdoor applications of similar kind. Further, replacement of more advanced, in particular dimmable, systems that are found in the same or similar applications is intended.

A currently available primitive approach of such a lighting application is a group of light sources, such as lightbulbs, (light) tubes and/or luminaires, operated with a switch, which would connect or disconnect the light source circuit to or from a power source, respectively (such as 230 VAC at a frequency of 50 Hz). However, in such a manual approach, the user needs to manually operate the switch in order to turn on the light sources.

Another approach includes the use of a sensing element and a switching element, where wires enable the guiding of control signals to and/or from the sensing element and the switching element. Even though no manual action of the user may be required in this approach, it requires extra wiring effort, extra material used and/or involves practical inherent limitations to the placement of the sensing element, the switching element and/or the light source group. Additionally, the system is not flexible as it is bound to the existing wired connections, as possible modifications and/or extensions require that rewiring is made.

DESCRIPTION OF THE INVENTION

Based on the above-described technical background, it is an object of the present invention to provide an improved lighting system for creating and/or expanding a wireless network between a sensor and at least one light source. Further objects of the present invention are to provide a sensor and a light source for such a lighting system. Moreover, an object of the present invention is to provide an improved method for creating and/or expanding a network between at least one light source and a sensor.

These objects are achieved by a lighting system, a light source, a sensor, and a method with the features according to the independent claims. Advantageous further embodiments result from the dependent claims, the description and the exemplary embodiments described in connection with the drawings.

Accordingly, a lighting system is provided, comprising at least one light source and a sensor, wherein the sensor is adapted for creating and/or expanding a wireless network between the sensor and each light source.

The lighting system described herein is a simplified system which enables the communication and thereby the creation and/or expansion of a network between a sensor and any number of light sources. The network preferably enables the monitoring and controlling of the light sources by the sensor via a wireless communication. Preferably, the lighting system comprises exactly one sensor.

The light source can be an LED lamp, an LED lamp tube, an LED retrofit lamp, preferably a retrofit T8 tube, a fluorescent lamp and/or a halogen lamp. The light source can be a ceiling lamp, a wall lamp, a bottom illumination, direct or indirect lighting, a signal lamp and/or a decorative lighting.

The sensor is responsible for creating and/or expanding a wireless network between the sensor and the at least one light source. Therefore, there may be no need for an additional gateway and a computing device communicating with each other via a wired connection and communicating with the sensor via a wired connection or a wireless connection. The sensor is preferably an autonomous component which is exclusively responsible for creating and/or expanding the network.

Hereinafter, the term "creating a wireless network" describes the ability of the sensor to communicate with each light source and establish a connection between the sensor and each light source. Further, the term "expanding a wireless network" describes the ability of the sensor to add any number of additional light sources to an existing network between the sensor and at least one light source.

The sensor is adapted for creating and/or expanding the wireless network. "Wireless" means that there is no wired connection between the sensor and the light sources or between different light sources. That is to say, the wireless network communicates via a wireless technology. Preferably, the only wired connection of the lighting system is the power supply to the sensor and to the light sources. Furthermore, a "network" preferably is an interconnection between at least two components, in particular the at least one light source and the sensor. Here, the sensor preferably has the function of a server of the network, i.e., a node that is connected to all of the other components of the network, and the light source preferably has the function of a client.

The sensor may have a separate power supply. Further, each light source can have a separate power supply or at least some of the light sources, preferably all light sources, may be connected to one common power supply. The power supply of the sensor and the light source is, for example, based on, preferably rechargeable, batteries. It is particularly possible that the hole lighting system is embodied wireless. That is to say, the network is based on a wireless communication between the sensor and the light sources.

In accordance with an embodiment of the lighting system, each light source of the network is exclusively connected to the sensor, each light source in particular being arranged as a client. "Exclusively connected" means that each light source is only connected to the sensor and there is no interconnection between different light sources of a network. Preferably, the lighting system is adapted such that is possible to separate each light source individually from the network without affecting the other light sources or the remaining network.

In particular, each light source is arranged as a client. In this case, the sensor is arranged as a server. The sensor may then be adapted for providing commands to the light sources and/or the light sources may be adapted for requesting and/or receiving commands from the sensor.

In accordance with another embodiment of the lighting system, the wireless network communicates via Bluetooth, Thread, Wi-Fi, in particular ZigBee, and/or a low-power wireless technology. Such a wireless connection may also be referred to as a "wireless technology" in the following. The wireless technology is preferably provided by a wireless control module of the sensor.

Further provided is a sensor for a lighting system. The sensor is preferably adapted for being used in a lighting system as described herein. That is to say, all features that are disclosed in connection with the sensor are also disclosed for the lighting system and vice versa.

The sensor comprises a wireless control module for establishing the creation and/or the expansion of the network. That is to say, the sensor is responsible for and/or adapted for, creating and/or expanding a network between the sensor and at least one light source.

The wireless control module is a component of the sensor, which is adapted for communicating with the wireless control module of the light source. The particular type of wireless control module depends on the wireless technology which is used for the communication between the sensor and the light sources. In a preferred embodiment, the wireless control module is an RF module for communicating via ZigBee & IEEE 802.15.4 standards.

In accordance with an embodiment of the sensor, the sensor is adapted to operate in at least one of the following operating modes: sensing mode, pairing mode, testing mode, network destruction mode. The sensor comprises a commissioning button for switching between the operating modes, in particular between the sensing mode and the pairing mode and/or between the sensing mode and the testing mode and/or between the sensing mode and the network destruction mode. Each of the sensing mode, the pairing mode, the testing mode, and the network destruction mode may correspond to an individual operation mode of the sensor.

After the sensor is turned on, the sensor preferably switches automatically into the sensing mode. In the sensing mode, the sensor is adapted for detecting the presence of a light source. This detection preferably takes place for light sources, which have not been paired previously (so-called "factory default mode" of the light source). Specifically, in the sensing mode, the sensor may detect light sources that are not part of the network, yet. A light source, which has not been previously paired, preferably automatically switches into a pairing mode of the light source, when the light source is turned on.

The factory default mode and the non-factory default mode of the light source each correspond to an operation mode of the light source. In the factory default mode, the light source is available for the sensor to become part of a network. Preferably, the light source switches into the factory default mode right after the light source is turned on. In the non-factory default mode, the light source is already paired and is not available for pairing with the same sensor or for pairing with a different sensor, corresponding to a different network, again. Preferably, the non-factory default is maintained when the light source has been turned off. That is to say, the light source stays in the non-factory default mode when no further action (such as a reset) other than turning the light source on or off is performed.

If the sensor has detected a light source, the sensor can be switched into the pairing mode, for example via the commission button of the sensor. The pairing mode is preferably available for a pre-defined time frame. That is to say, the sensor may be adjusted such that it is in the pairing mode only for a specified time frame (also called: time window). The sensor can establish a connection to the light sources when the sensor is in pairing mode, thereby creating a network and/or expanding an already existing network.

In the testing mode, the user can check whether the pairing between the sensor and the light sources was successful. The testing mode is a timed mode which can be started via the commissioning button of the sensor. The sensor is preferably adjusted such that it is in the testing mode only for a pre-defined time frame. After the time frame of the testing mode has lapsed, the sensor preferably switches back into the sensing mode.

In the network destruction mode, the sensor can separate each light source of the network, preferably individually, from the network. Thereby, the communication between the sensor and the light sources may be stopped. In particular, in the network destruction mode, the sensor can destruct the entire network. The network destruction mode can be achieved from the sensor side by the use of the commissioning button of the sensor. If the network consists of only one light source, there is also the possibility to remove the single light source from the network by its commissioning button and thereby destruct the network.

The commissioning button of the sensor is adapted to receive information in the form of user inputs and transfer the information to a sensor MCU. In particular, the commissioning button of the sensor is used to switch between different operation modes. The commissioning button of the sensor is adapted to switch between the sensing mode and the pairing mode, the sensing mode and the testing mode and/or to start the network destruction mode. The commissioning button of the sensor can be a direct pressable button. The user input may than, for example, be at least one long press and/or at least one short press and/or a pre-defined number of presses. For example, one input of the user may be a long press for more than one second, whereas another input may be five times a short press. Each of the inputs may correspond to a different operation mode of the sensor. Other intended implementations of the user interface are reed contacts, indirect capacitive touch buttons, NFC devices or optically activated electronic switching devices, like phototransistors or IR receivers. In the case of an indirect capacitive touch button or NFC tag, the user input may be a, particularly short, hover duration and/or a long hover duration. The commissioning button of the sensor can also be an arbitrary component which is suitable for receiving any user input, for example an audio component which receives voice commands.

The internals of the sensor preferably comprise the main power supply for the whole sensor hardware, the core sensor MCU, which operates the sensor hardware, the configuration potentiometers, a standard-part LED to provide optical feedback to the user for the current mode and/or on whether the sensor was triggered (so-called LED feedback), the wireless communication module and/or the commissioning button. The interfacing of the sensor MCU with the rest of the system preferably takes place by the use of configuration potentiometers, the LED feedback and/or the wireless communication module. The wireless communication module communicates with the rest of the network via an antenna.

In accordance with an embodiment of the sensor, the sensor is an occupancy sensor. The occupancy sensor may comprise an integrated detection circuit, preferably implemented based on a passive infrared (PIR) sensor, a Fresnel lens, an integrated signal LED for user feedback, potentiometers, in particular non-network configuration potentiometers, for adjusting the sensitivity and the turn-off delay time, a commissioning button, and an integrated wireless control module for communication with the light sources. The type of the wireless control module depends on the wireless technology which is used for the communication between the sensor and the light sources. In a preferred embodiment, the wireless control module is a RF module for communicating via ZigBee & IEEE 802.15.4 standards.

In a particularly preferred embodiment, the sensor comprises at least one sensor transducer. The sensor transducer can be a movement and/or presence sensor and/or a daylight transducer. Preferably, the sensor transducer comprises a PIR sensor and a daylight threshold sensor to measure ambient light intensity. By the sensor transducer, an additional control component of the system is provided. Thereby, the sensor is able to synchronize the commands given to the light sources with ambient conditions, for example the ambient light intensity determined by a daylight transducer. It is also possible to control the command given from the sensor to the light sources depending on the presence or absence of a person, vehicle or another object detected by a movement and/or presence transducer.

Further provided is a light source for a lighting system. Preferably, the light source is adapted for being comprised by a lighting system as described above and/or for being connected to a sensor as described above. That is to say, all features that are disclosed in connection with the lighting system and/or the sensor are also disclosed for the light source and vice versa.

The light source comprises a wireless control module, wherein the wireless control module of the light source is adapted for communicating with the wireless control module of the sensor.

In a preferred embodiment, the light source comprises a commissioning button wherein the commissioning button is adapted for pairing the light source to a sensor for creating and/or expanding a network and/or for removing the light source from the network. The commissioning button of the light source is adapted for receiving information in the form of user inputs and for transferring the information to a light source MCU. The commissioning button of the light source may be embodied like the commissioning button of the sensor, preferably as a pressable button. Further, the user input for the commissioning button of the light source may be embodied similar to the user input for the commissioning button of the sensor. Different user inputs may correspond to different operation modes of the light source.

Furthermore, a method for creating and/or expanding a network between a sensor and at least one light source is provided. Preferably, the network is created and/or expanded between the sensor described herein and/or the light source described herein, particularly preferably with a lighting system described herein. In other words, the method is preferably performed with a light source, a sensor and/or a lighting system described herein. That is to say, all features that are disclosed with respect to the light source, the sensor and/or the lighting system are also disclosed for the method and vice versa.

Accordingly, a method is provided for creating and/or expanding a network between a sensor and at least one light source, comprising the steps of a) turning on the sensor;
b) turning on and/or resetting the light source;
c) determining in the light source after the light source is turned on, whether the light source is in a factory default mode, wherein if the light source is in the factory default mode, the light source switches into a light pairing mode for pairing the sensor and the light source;
d) pairing the sensor and the light source to establish or expand a network.

The method preferably comprises the use of a commissioning button comprised by the sensor to switch the sensor into a pairing mode. The light source may be adapted for providing a timeslot-based auto-commissioning mode, which does not require any user interaction on the device to bring a light source into a network rather than powering it up.

Referring to step a) of the above-mentioned method, the sensor is responsible for the creation and/or expansion of the network. The sensor is preferably adjusted such that, when it is in the sensing mode, it detects the presence of light sources in the factory default mode. After the sensor is turned on, the sensor preferably switches automatically into the sensing mode. The sensing mode and the factory default mode are preferably the sensing mode and the factory default mode as described above in connection with the lighting system and/or the sensor and/or the light source.

Referring to step b) of the above-mentioned method, the light sources are turned on to enable the sensor to create and/or expand the network between the sensor and the light sources. A light source which is not turned on cannot become a part of the network. However, if a light source previously has been part of a network, it preferably is still part of the network when it is turned off and turned on again. It is also possible to reset a previously paired light source which is already part of a network by using its commissioning button. If the light source is reset, the light source automatically switches into default mode and is available for the sensor.

Referring to step c) of the above-mentioned method, when the light source initially turns on, it switches into one of two possible states. If the light source was previously paired (non-factory default mode), it switches back to the dimming status it had before it was turned off. If the light source was not paired before or has been reset (factory default mode), it goes automatically into a timed pairing mode (pairing window).

Referring to step d) of the above-mentioned method, the sensor in pairing mode preferably pairs with any new light source powering up which is not yet part of the network and/or a different network and therefore un-commissioned.

In accordance with an embodiment of the method, pairing stops either after the time window for the pairing process of the sensor is expired or if the user stops the process manually on the sensor after commissioning the last light source. If during this pairing window a sensor requests the light source to join the network, the light source may be paired. The light source will then switch from factory default to non-factory default mode and start following the sensor's commands. The indication feedback to the user that a light source has joined the sensor's network may be given in the form of a user feedback, preferably in the form of an optical user feedback. During pairing mode of the sensor, the light source may dim down and/or start to blink to indicate successful pairing and distinguish itself from the unpaired lamps. When the sensor enters normal mode, the lamp preferably starts following the sensor commands.

In accordance with an embodiment of the method, the light source switches into a normal mode, if the light source is in non-factory default mode. A light source which is in non-default mode is preferably already paired to a sensor. The light source is thus not available for a different sensor for pairing and therefore cannot be paired to said different sensor and become part of a different network. If a light source is turned on and in non-factory default mode, it switches back to the dimming status and/or to the setting it had before it was turned off. The normal mode describes an operation mode of the light source, in which the light source is already paired and dimmed or configured by the sensor.

In accordance with another embodiment of the method, the light source switches back to the factory default mode, if the pairing between the sensor and the light source is unsuccessful and/or if a predetermined time has lapsed. If the light source does not receive a pairing request from a sensor inside this pairing window and the pairing window expires or the pairing is unsuccessful, the light source may switch into a locked unpaired mode. Preferably, the light source than stays at a 100% dimming level and the pairing windows does not enter the pairing mode again until it is turned-off and on again.

A non-commissioned light source preferably performs a binding procedure (i.e. pairing) after power up. The binding preferably takes place automatically during a dedicated binding time window. The binding may be performed with any sensor in range which is in active pairing mode. If a light source has been accidently paired to the wrong sensor, the user can reset the bindings of the light source with the commissioning button on the light source by performing the required input for a reset. A new commissioning attempt may be started afterwards.

The light source may signal a successful binding to a sensor through dimming to a predefined level after the binding is established. A non-successful binding may be signaled through dimming to full brightness after the binding window is expired.

Dedicated button press sequences on the sensor may provide at least one of the following two additional troubleshooting modes: The first sequence will cause all commissioned light sources which are bound to this sensor to perform a full factory reset and therefore be removed from the network. The second sequence will cause all commissioned light source which are bound to this sensor to signal simultaneously that they are part of the network.

In accordance with another embodiment of the disclosure, the method further comprises the step of switching the sensor into a sensor pairing mode after the sensor has been switched on and/or a button has been pressed. The sensor preferably automatically switches into sensing mode after it is switched on and can be switched into pairing mode by using the commissioning button.

In accordance with another embodiment of the disclosure, the sensor switches into a sensing mode for detecting a presence of a light source before step c). Preferably, the sensor automatically switches into the sensing mode. Thereby, no additional user input may be required.

In accordance with another embodiment of the disclosure, an LED feedback light of the sensor lights up when the sensor is turned on and/or when a presence of a light source is detected. This may allow for a user feedback for starting the pairing.

In accordance with another embodiment of the disclosure, the sensor is adapted for being switched into a testing mode and/or into a network destruction mode. Switching into one of these modes preferably is performed via the commissioning button of the sensor.

The testing mode preferably is an operating mode of the sensor, wherein the user can review if the pairing between the sensor and the light sources was successful. The testing mode is a timed mode which can be started by the commissioning button of the sensor. After a predetermined time of the testing mode has lapsed the sensor switches back into the sensing mode.

The network destruction mode preferably describes an operating mode of the sensor, wherein the sensor can separate each light source of the network and thereby stop the communication between the sensor and the light sources, more precisely destruct the network. The network destruction mode can be achieved from the sensor side by the use of the commissioning button. If the network consists of only one light source, there is also the possibility to remove the single light source from the network by its commissioning button and thereby destruct the network.

The lighting system may also make use of gateways and graphical visualization and/or user interfaces for scanning the wireless network. Furthermore, it is possible to identify individual devices e.g. though barcodes or searching/blinking methods and binding them to each other (establishing the sensor-lamp control relationship). In addition, or as an alternative, binding between the sensor and the light source may be established through proximity detection based on RF signal strength (TouchLink process in ZigBee Light Link).

BRIEF DESCRIPTION OF THE DRAWINGS

Preferred embodiments of the invention will be explained in the following, having regard to the drawings.

DETAILED DESCRIPTION OF EXEMPLARY EMBODIMENTS

Figure 1A:
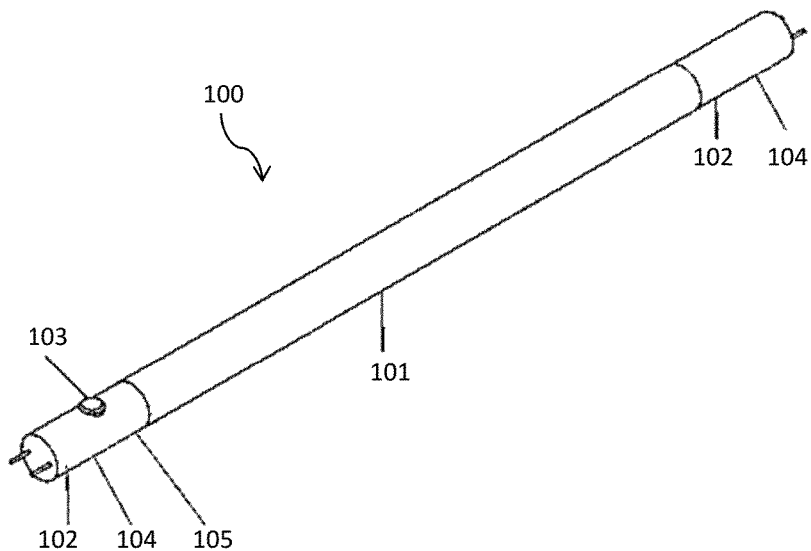
FIGS. 1A, 1B, 2, 3, 4, 5, 6, 7, 8, 9, 10A and 10B show exemplary embodiments of a lighting system, a method, a light source and/or a sensor as described herein.

In the following, preferred embodiments of the invention will be described with reference to the drawings. Here, elements that are identical, similar or have an identical or similar effect are provided with the same reference numerals in the figures. Repeating the description of such elements may be omitted in order to prevent redundant descriptions.

The figures and the size relationships of the elements illustrated in the figures among one another should not be regarded as to scale. Rather, individual elements may be illustrated with an exaggerated size to enable better illustration and/or better understanding.

Hereinafter, the term "lamp" or "tube" may denote a light source. That is to say, all features that are disclosed with reference to a lamp or a tube may also be disclosed for the light source. Further, the term "sensing element" or likewise may denote a sensor. That is to say, all features that are disclosed with reference to a sensing element may also be disclosed for the sensor.

Figure 1B:
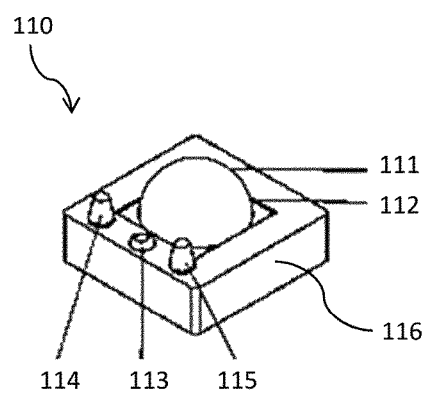

With reference to FIGS. 1A and 1B, an exemplary embodiment of a lighting system, in particular a wireless lighting control system, as described herein is explained in detail.

The present application involves a commissioning and diagnostic/troubleshooting method for a wireless control system for lighting control and occupancy detection. The lighting system is particularly intended for retrofitting existing lighting systems, in particular existing T8 fluorescent lighting systems, with LED lamps and adding wireless occupancy sensors for energy savings to the retrofitted installation.

The lighting system comprises, preferably consists of, at least one or more light sources 100, in particular an LED retrofit lamp, and an occupancy sensor 110, in particular a PR occupancy sensor. In a preferred embodiment, the lighting system comprises one sensor and a group of 1 to 50 retrofit LED tubes 100. Preferred LED lamp types are retrofit T8 tubes with classic endcaps modified to accommodate a button.

The light sources 100 and the sensor 101 are connected to each other through a wireless communication technology. The preferred implementation of this wireless connection is based on the ZigBee & IEEE 802.15.4 standards. Other intended implementations are based on Bluetooth Low Energy, Bluetooth Mesh, Thread, Wifi or other Low Power Wireless Control technologies.

The light source 100 comprises, in particular consists of, a tube 101 with an integrated LED module and two endcaps 102 with the electrical connections for T8 fluorescent lamp holders. The electronic driver circuit 104 for powering the LED module is typically integrated into the endcaps 102. One endcap 102 has an integrated wireless control module 105, in particular an integrated RF communication module, for communication with the sensor 110, and a user interface 103 for resetting the communication parameters of the light source 100. The preferred implementation of the user interface 103 is a push button. Other intended implementations of the user interface 103 are reed contacts, NFC devices or optically activated electronic switching devices, like phototransistors or IR receivers.

The occupancy sensor 110 comprises, in particular consists of, an integrated detection circuit, preferably implemented based on a passive infrared (PIR) sensor, a Fresnel lens 111, an integrated signal LED 112 for user feedback, potentiometers 113, 115, in particular non-network configuration potentiometers, for adjusting the sensitivity and the turn-off delay time, a commissioning button 114, and an integrated wireless control module 116, in particular an integrated RF communication module, for communication with the light sources 100. The sensor 110 may include movement/presence and/or daylight transducers.

The sensor 110, apart from its sensor-specific hardware, has a hardware part implementing a wireless technology in the 900 MHz-2.4 GHz range, one to three (preferred one) commissioning button-like user inputs 114 that can have the form of a direct pressable button, or an indirect capacitive touch button or NFC tag or similar (preferred is a pressable button, also named "SENSOR LINK" in the following) and an optical user feedback 112 in the form of a standard-part LED or similar (also named "LED FEEDBACK" in the following). The sensor 110 has four modes of operation: normal sensing mode, pairing mode, testing mode and network destruction mode.

The light source 100, in particular the LED retrofit lamp, has, like in the sensor case, a commissioning button-like user input 103 either directly pressable or an indirect capacitive touch button or NFC tag (preferred is a pressable button, also named "TUBE LINK" in the following). All user inputs are in the form of short presses and long presses for both pressable and capacitive touch buttons or in the case of NFC, short hover duration is accounted as short press and long hover duration is accounted as long press. The commissioning buttons are used in the following numbered cases to either pair to a network or reset the network or remove one part of the network. The tube operates in three modes: factory default mode, normal paired (non-factory default) mode and locked unpaired mode.

Figure 2:
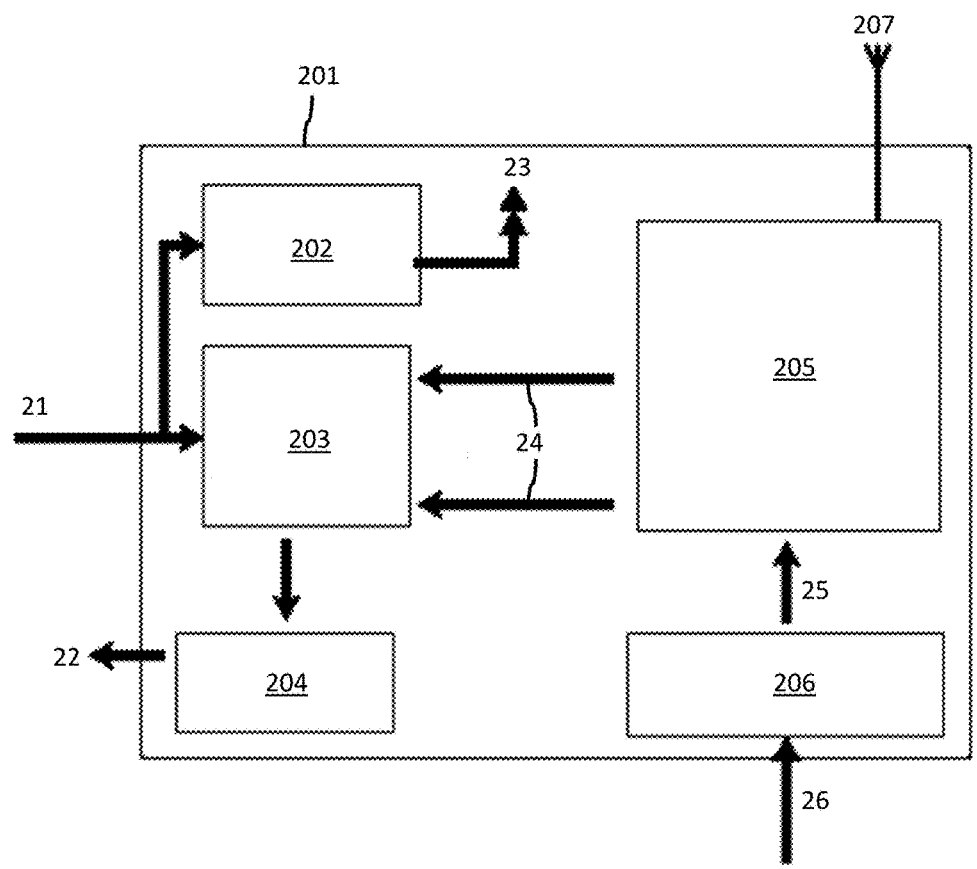

FIG. 2 shows a block diagram for the parts of an exemplary embodiment of the tube 201 and their interactions. Specifically, the reference signs in FIG. 2 indicate: 202: auxiliary power supply; 203: LED current regulated dimmable driver; 204: LED Light engine; 205: 802.15.4 MCU and hardware for network management; 206: commissioning button (tube link); 207: antenna; 21: main input; 22: light output; 23: $V_{cc}$; 25: direct connection; 26: user input (long press); 24: indicates analog shaped PWM commands, dimming commands, on/off CMOS two level command.

The internals of the tube comprise the main LED current regulated dimmable driver. Taking power input from the main voltage, it drives the light engine which produces visible light. Additionally, there is an auxiliary supply circuit that provides the power input to the 802.15.4 RF module. The RF module has an antenna to perform the RF communication with the rest of the LED retrofit lamps and the sensor and interfaces with the LED driver to give out dimming and ON/OFF commands in order to alter the visible output of the lamp. This interfacing includes a PWM signal which passes through a low-pass filter to produce an analog voltage signal, the level of which defines the target dimming level for the visible output. The ON/01-1-signal represents a digital signal which enables or disables the operation of the LED driver. In the case of the OFF signal, while the LED driver does not operate, giving no current to the LED light engine, the auxiliary supply unit does operate in order to keep the RF module running and keep the communication with the rest of the system active. In the case of the OFF signal, the whole LED lamp runs in standby power. The user input to the lamp comes from its commissioning button (TUBE LINK) that has a direct connection with the RF module which can distinguish between the short and long presses.

Figure 3:
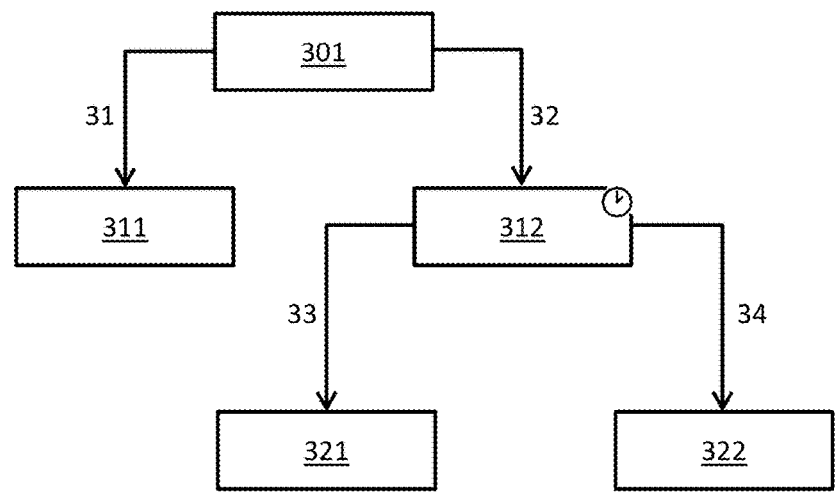

FIG. 3 schematically shows an exemplary embodiment of a tube start-up sequence or process. Specifically, the reference signs in FIG. 3 indicate: 301: tube turn-on; 311: normal mode, wherein the previous status, in particular the previous dimming status, is given by sensor; 312: pairing mode (active for 10 seconds to 5 minutes, preferred 5 minutes); 321: locked unpaired (to 100% dimming), remains in factory default mode; 322: paired; tube blinks 1 to 5 times (preferred once); goes to non-factory default mode; during sensor pairing mode: dims down to indicate that is paired; during sensor normal mode: follows sensor commands; 31: non-factory default (previously paired); 32: factory default (not previously paired); 33: unsuccessful pairing; 34: successful pairing When the LED lamp initially turns on, it goes into two possible states. If the lamp was previously paired (non-factory default mode), it goes back to the dimming status it had before it was turned off. If the lamp was not paired before or reset (factory default), then it goes automatically into a timed pairing mode (pairing window) that lasts from 10 seconds to 5 minutes (preferred is 5 minutes). If the lamp does not receive a pairing request from a sensor inside this pairing window and the pairing window expires, the lamp gets into locked unpaired mode and stays at a 100% dimming level and the pairing windows does not enter the pairing mode again until it is turned-off and on again. If during this pairing window a sensor requests the lamp to join the network, the lamp is paired, goes from factory default to non-factory default mode and starts following sensor's commands. The indication feedback to the user that a lamp has joined the sensor's network is given in the form of a short lamp blink from 1 to 5 times (preferred 1 time). During pairing mode of the sensor (explained in sensor section), the lamp dims down to a level between 1% and 50% (preferred 20%) to indicate successful pairing and distinguish itself from the unpaired lamps and when the sensor enters normal mode (explained in sensor section) the lamp starts following the sensor commands.

Figure 4:
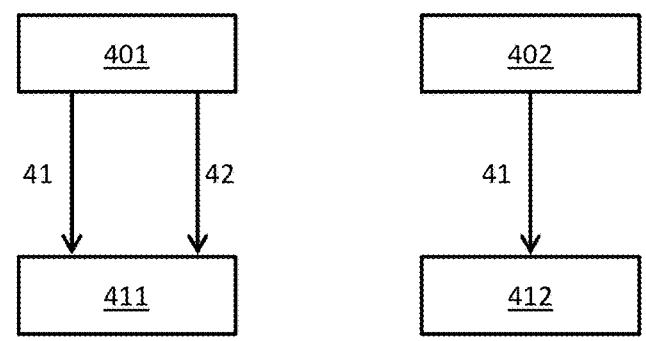

FIG. 4 schematically shows an exemplary embodiment of how the network is left by a light source and/or destroyed, for example via a lamp reset button or by a removal from the sensor side. The reference signs in FIG. 4 indicate: 401: tube normal paired mode; 402: tube factory default mode; 411: factory default; blinks 1 to 5 times (preferred once); pairing window opens for 10 seconds-5 minutes (preferred 5 minutes); 412: blinks 1 to 5 times (preferred once); no other change; 41: tube link, 1 to 10 seconds long press (preferred 4 seconds); 42: network destruction received from sensor.

The removal of a single lamp from a sensor network may be accomplished by using its commissioning button. For example, a long press for 1 to 10 seconds (preferred is 4 seconds) will cause a previously paired lamp that is in non-factory default mode to exit a sensor network. The indication of successful removal from the network may be a blink of 1 to 5 times (preferred is once). Upon successful exit from a sensor network the lamp will automatically enter the previously described pairing window. Exactly the same result occurs when the lamp receives a network destruction command from the sensor (explained below). In the case the lamp was previously already in factory default mode and the commissioning button is used as just explained, the lamp will still blink but no other change will occur.

Figure 5:
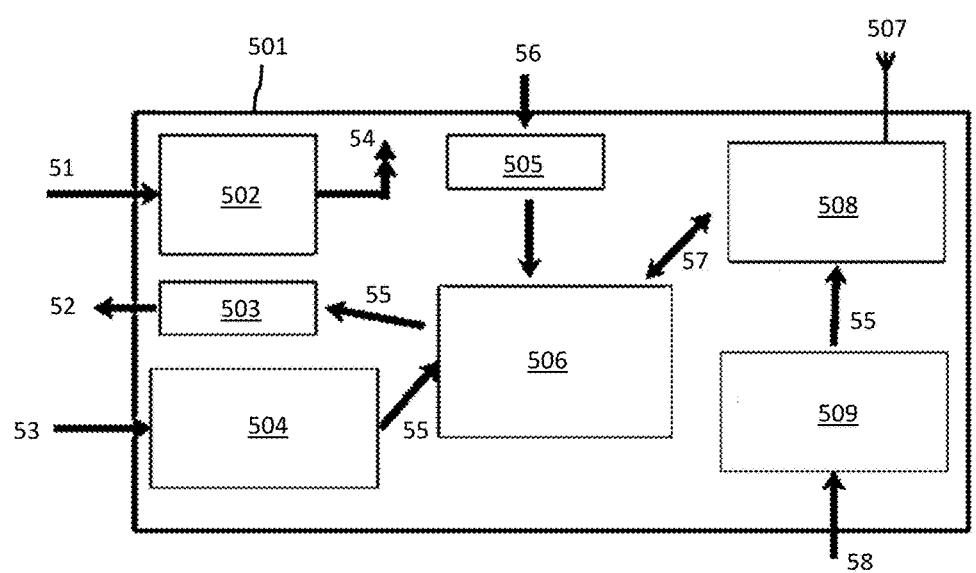

FIG. 5 shows a block diagram of an exemplary embodiment of a sensor 501, in particular the internal parts and/or their interaction. The individual reference signs in FIG. 5 indicate: 501: sensor; 502: power supply; 503: LED feedback; 504: configuration potentiometers; 505: sensor transducers; 506: sensor MCU and hardware interfacing; 507: antenna; 508: 802.15.4 MCU and hardware for network management; 510: commissioning button (sensor link); 51: main input; 52: user optical feedback; 53: user input (for non-network configurations); 54: $V_{cc}$; 55: direct connection; 56; movement and daylight physical input; 57: UART command exchange; 58: User input (short and long presses)

The internals of the sensor comprise, in particular comprise of, the main power supply for the whole sensor hardware, the sensor transducers (any movement or presence sensor, preferably a PIR sensor and a daylight threshold to measure ambient light intensity), the core sensor MCU that operates the sensor hardware, the configuration potentiometers, a standard-part LED to provide optical feedback to the user for the current mode or whether the sensor was triggered, the 802.15.4 RF module and the commissioning button. The interfacing of the sensor MCU with the rest of the system is with the configuration potentiometers (direct electrical connection), the LED feedback part (direct electrical connection) and the RF module (UART communication port). The user input as far as the commissioning button is concerned, is transferred directly to the RF module to be processed as soon as possible. The RF module communicates with the rest of the network with the antenna.

Figure 6:
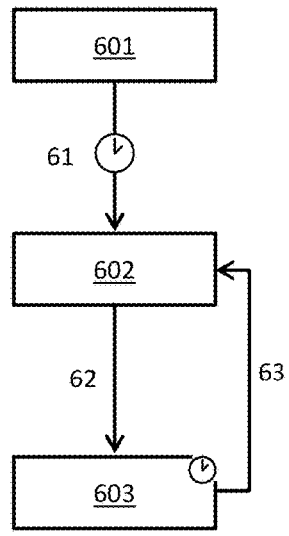

FIG. 6 shows an exemplary embodiment of a sensor start-up sequence. The reference signs in FIG. 6 indicate: 601: sensor turn-on; sensor boots up; LED feedback lights up; 602: sensing mode; LED feedback lights up when presence is detected; 603: pairing mode; LED Feedback flashes every 0.5 to 5 seconds (preferred every 1 second); 61: 1 to 10 seconds (preferred 10 seconds); 62: sensor link; 1 to 10 seconds long press (preferred 4 seconds). 63: sensor link 1 to 10 seconds long press (preferred 4 seconds) or wait for 30 seconds to 60 minutes (preferred 50 minutes) until pairing mode expires.

When the sensor is powered on, it boots up and its LED feedback light turns on. After 1 to 10 seconds, the LED turns off and indicates that the system is ready to use. The sensor goes automatically into normal sensing mode and the LED feedback light blinks when movement is detected. Regardless of whether the sensor has already created a network and paired lamps (non-factory default) or not (factory default), the sensor can be entered into pairing mode by long pressing its commissioning button from 1 to 10 seconds (preferred 4 seconds). The pairing mode of the sensor is timed and lasts from 30 seconds to 60 minutes (preferred 50 minutes) after which it automatically expires or it is manually stopped by long pressing again the commissioning button from 1 to 10 seconds (4 seconds is preferred). While in pairing mode, the LED feedback of the sensor blinks every 0.5 seconds to 5 seconds (preferred 1 second) to indicate that the sensor is in pairing mode.

The system level operation process depends on the timing on which sensor and lamps coincide with each other. For example, for the system to operate properly all parts (sensors and lamps) should be on and with an operating RF part, otherwise internal operations of parts of the system while other parts are not present or operating can cause malfunction. For example, if the sensor is powered and some or all of the lamps are not powered there are some cases (e.g. network destruction as explained below) that will reset the sensor and leave the lamps paired to a non-existent network. The processes are explained with reference to FIGS. 7 and 8 with the flowcharts and timings being shown for both sensor and lamps at the same flowchart.

Figure 7:
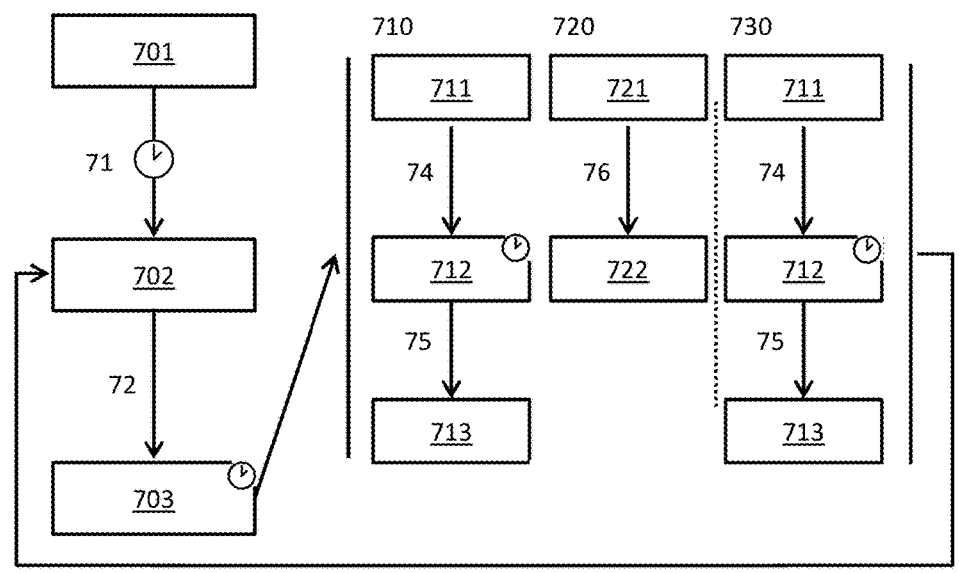

FIG. 7 shows an exemplary embodiment of a pairing sequence between the sensor and the tubes. The individual reference signs in FIG. 7 indicate: 701: sensor turn-on; sensor boots up; LED feedback lights up; 702: sensing mode; LED Feedback lights up when presence is detected; 703: pairing mode; LED feedback flashes 0.5 to 5 seconds (preferred every 1 second); 710: tube no. 1; 711: turned-on or reset; 712: pairing mode (active for 10 seconds-5 minutes); 713: paired; tube blinks 1 to 5 times (preferred once); 720: tube no. 2: 721: turned-on; 722: no pairing interaction; 730: tube no. N. Further, it is shown: 71: 1 to 10 seconds (preferred 10 seconds); 72: sensor link; 1 to 10 seconds long press (preferred 4 seconds); 73: sensor link 1 to 10 seconds long press (preferred 4 seconds); wait for 30 seconds to 60 minutes (preferred 50 minutes) until pairing mode expires; 74: factory default mode; 75: acknowledges sensor pairing; 76: previously paired (non-factory default).

Figure 8:
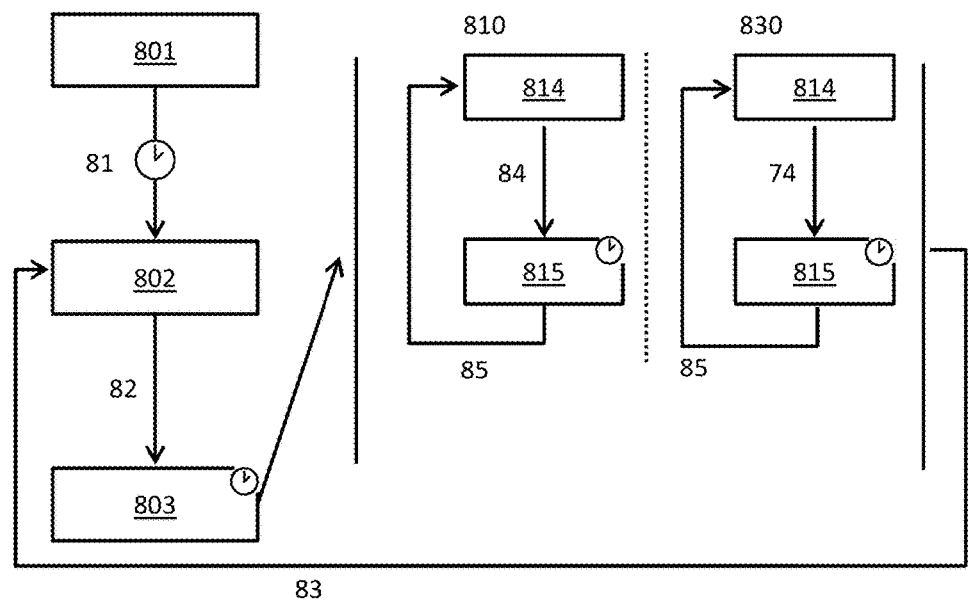

FIG. 8 shows an exemplary embodiment of a testing sequence, in particular a sensor-tube testing sequence. Reference signs in FIG. 8 indicate: 801: sensor turn-on; sensor boots up; LED feedback lights up; 802: sensing mode; LED feedback lights up when presence is detected; 803: Testing Mode; LED Feedback flashes every 0.5 to 5 seconds (preferred 1 second); 810: Tube no. 1; 814: normal paired mode; 815: testing mode; switches on and off every 0.5 to 5 seconds, preferred 1 second; 81: 1 to 10 seconds (preferred 10 seconds); 82: sensor link; 1 to 10 times short press (preferred 2 times); 83: sensor link 1 to 10 times (preferred 2 times) short press to end testing mode or wait for 5 to 60 seconds (preferred 30 seconds) until testing mode expires; 84: receives test command; 85: receives end testing mode or ends automatically after 5 to 60 seconds (preferred 30 seconds).

The following paragraph relates to the pairing, in particular network creation or network expansion (FIG. 7). The sensor is responsible for the creation or expansion of the network.

In order for this to be accomplished, the sensor should enter pairing mode and the lamps should be in pairing mode at the same time. If one of the system parts is not in pairing mode than no network binding can occur. From the sensor side, the pairing window is activated by using the commissioning button. From the lamp point of view, the pairing window is opened right when the factory default lamp is turned on, or right after the lamp is reset or brought to factory default by network destruction initiated by the sensor. An already existing system created by the sensor with previously paired lamps does not exclude additional factory default lamps to be paired if the sensor goes into pairing mode.

The following two paragraphs relate to the testing (FIG. 8). In order for the user to determine the successful pairing of the desired lamps to a specific sensor the commissioning button of the sensor can be used. Given an already paired system with a sensor and non-factory default lamps, by short pressing the sensor button from 1 to 10 times (preferred 2 times) the testing mode of both sensor and lamps is entered. The testing mode is a timed mode, which means that it lasts for 5 seconds to 60 seconds (preferred 30 seconds) and then it expires and the sensor goes back into normal sensing mode. Alternatively, by using the same short pressing of the sensor commissioning button while in testing mode, the sensor returns manually to normal mode. While the sensor is in testing mode, its LED feedback blinks every 0.5 to 5 seconds to indicate that the sensor is in testing mode.

From the lamps point of view, when the testing mode is received, the lamp enters a timed testing mode during which the lamp turns ON and OFF (the lamp RF module gives the respective commands to the LED driver) every 0.5 to 10 seconds (preferred 1 second) to indicate to the user which lamps are paired to the specific sensor whose commissioning button was pressed. After testing mode is exited (either expired or manually from sensor) the lamp returns to normal mode and follows the sensor commands.

Figure 9:
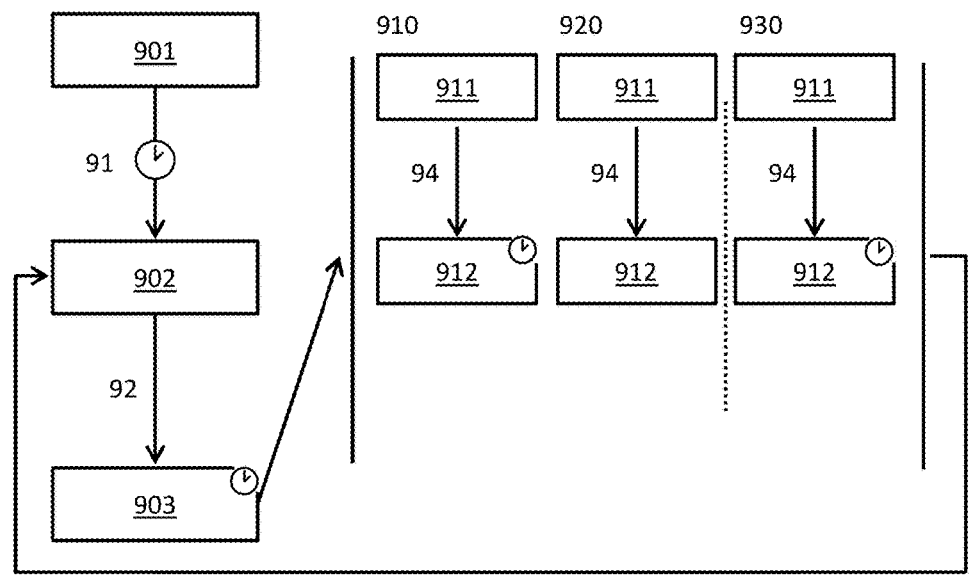

FIG. 9 shows an exemplary embodiment of a tube reset sequence and/or a sensor network destruction sequence. The reference signs in FIG. 9 indicate: 901: sensor turn-on; sensor boots up; LED feedback lights up; 902: sensing mode; LED feedback lights up when presence is detected; 903: network destruction mode; LED feedback turns on for 1 to 60 seconds (preferred 30 seconds), sends network destruction command and afterwards blinks 1 to 10 times (preferred 3 times); 910: Tube no. 1; 920: Tube no. 2; 930: Tube no. N; 911: normal paired mode; 912: factory default; blinks 1 to 5 times (preferred once); pairing window opens for 10 seconds-5 minutes, preferred 5 minutes; 91: 1 to 10 seconds (preferred 10 seconds); 92: Sensor link; 1 to 15 times (preferred 10 times) short press 94: receives network destruction command.

Complete network destruction at one time can be achieved from the sensor side by the use of the commissioning button. Given a system of paired sensor and lamps, when the user short presses the sensor commissioning button for 1 to 15 times (preferred 10 times), the sensor starts destroying the network. This process is timed and lasts from 1 to 60 seconds (preferred 30 seconds). While the network destruction process is active, the sensor LED feedback lights up for 1 to 60 seconds (preferred 30 seconds). After the sensor completes the network destruction, its LED feedback blinks from 1 to 10 times (preferred 3 times). When the lamps are in normal paired mode (and paired with this specific sensor) and they receive the network destruction command, they leave the sensor network, they go to factory default mode, blink from 1 to 5 times (preferred is once) and they enter their pairing mode window as explained in the lamp section. If some paired (with this sensor) lamps are not powered on when the sensor sends out the network destruction command, then these lamps are locked into a non-existent network (just destroyed from sensor) and can be reset from their button in order to be paired again. Otherwise their dimming status will always be 100% in the absence of a sensor network.

Figure 10A:
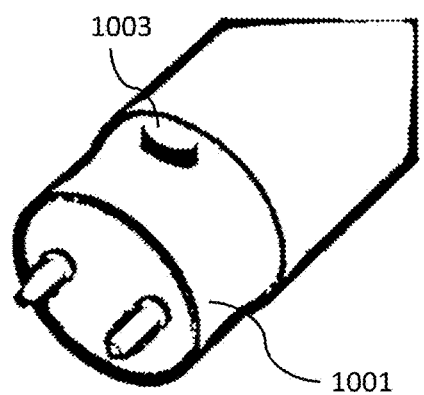
Figure 10B:
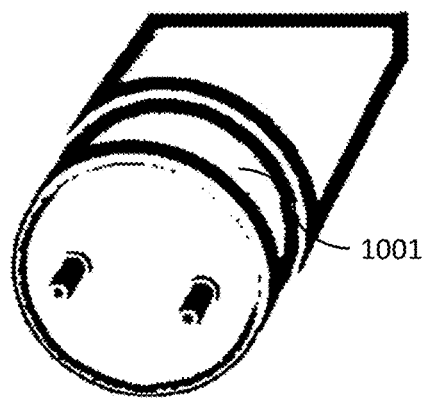

FIGS. 10A and 10B show an exemplary embodiment for a light source, in particular a tube. The tube comprises an end cap 1001 and a push button 1003.

The tubes are meant to replace non-dimmable T8 4 ft (L36) and 5 ft (L58) tubes (so-called "substitube") connected to conventional control gears (CCGs) with a so-called dimmable "substitube" connected lamp controlled by a sensor without the installation of any additional control wiring. For this to happen, the "substitube" connected tubes are equipped with a ZigBee module that wirelessly connects to a sensor network and receives DIM-UP/DOWN and ON/OFF commands. The master role of the network is played by the sensor.

The tubes are split in two types: a) T8 5 ft (1500 mm) tube with 24 W and 3600 lm and b) T8 4 ft (1200 mm) tube with 16 W and 2400 lm. Standby power requirement for the tube may be <500 mW. The interface of the tube with the user is the push button at the endcap. The push button may be the only relevant interface in the present application. It is possible that the tubes are not suitable to be connected with electronic ballasts (ECGs).

The technical characteristics of exemplary embodiments of the tubes, in particular a 4 ft-tube and a 5 ft-tube, are given in the following table 1:

TABLE 1

| (technical characteristics) | | |
|---|---|---|
|  | 4 ft | 5 ft |
| Luminous flux (lm) | 2400 | 3600 |
| Color temperature (K) | 4000/6500 | 4000/6500 |
| Input voltage (V) | 230 (at 50/60 Hz) | 230 (at 50/60 Hz) |
| Power factor (−) | >0.9 | >0.9 |
| Input power (W) | <16 W | <24 W |
| Operating ambient temperature (° C.) | −20-50 | −20-50 |
| Degree of protection provided by enclosure (IP) | IP 20 | IP 20 |

The ZigBee Lightify module used in the tubes may be ZigBee module purchased and placed as a discrete component in the tube. The chipset used on this module may be based on a Marvel chip. The operating characteristics for an exemplary embodiment of the ZigBee module are given in the following table 2:

TABLE 2

(operation characteristics)

| Parameters | Min | Type | Max |
|---|---|---|---|
| Operation ambient temperature $T_a$ (° C.) | −40 | | 105 |
| Vcc (V) | 3.0 | 3.3 | 3.5 |
| Active current at $T_a$ = 25° C., $V_{cc}$ > 2.7 V (mA) | | 27 | 50 |
| Active current at $T_a$ = 25° C., $V_{cc}$ < 2.7 V (mA) | | 28 | 75 |

Figure 11A:
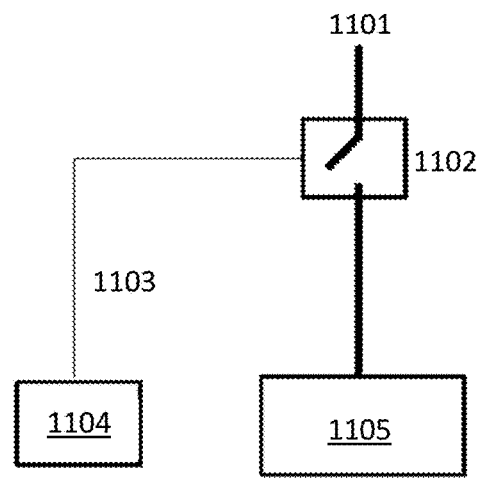
FIGS. 11A, 11B, 11C, 11D and 12 show alternative embodiments of a lighting system and a method for establishing a network.
Figure 11B:
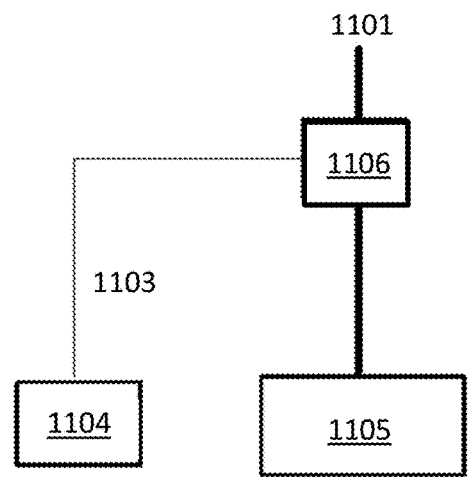
Figure 11C:
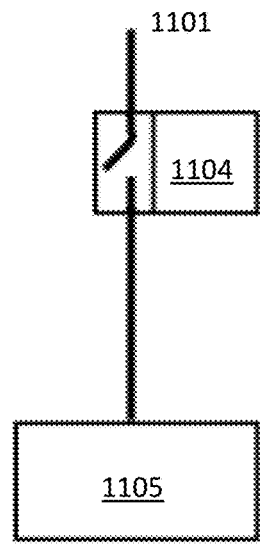
Figure 11D:
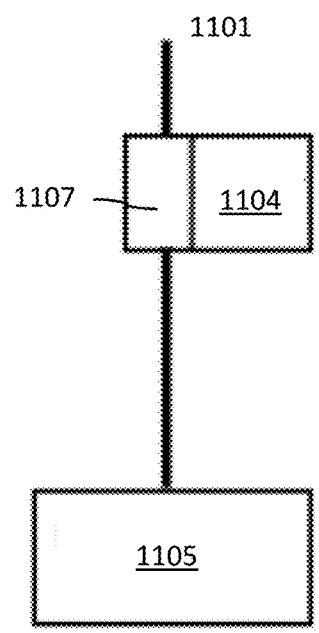

With reference to FIGS. 11A to 11D, alternative embodiments of a lighting system are described. FIG. 11A shows an alternative embodiment with a classic sensor with wired switch action. FIG. 11B shows an alternative embodiment with a sensor with a wired dimmable control. FIG. 11C shows an alternative embodiment with a sensor with an embedded switch. FIG. 11D shows an alternative embodiment with a sensor with an embedded dimmable control.

The reference signs in FIGS. 11A to 11D indicate: 1101: power source; 1102: switch with remote wired control; 1103: wired low voltage signal; 1104: sensor; 1105: light source group. 1106: dimmer with remote wired control; 1107: dimmer.

In order to describe the system concept and functional details, a more general approach will be used. This will be done in order to show that this concept can be used for slightly or much different applications, with different controller and end point types, different technical details such as used frequencies as well as other protocols. In between the general descriptions of the concept, specific details of the project implementations will be mentioned. The core description of the system actually involves a sensing controller element (of any sensing technology like infrared, RF, etc.) and a group of light sources (classic, LED or other).

This system is thought and used to replace both a classic light (with LED technology or not) application found in fairly large rooms or buildings like garages, industrial complexes, storage rooms, offices and indoor or outdoor applications of similar kind and a dimmable, more advanced system that is found in the same or similar applications. A primitive approach of such a lighting application is a group of light sources, such as lightbulbs, tubes and/or luminaires, etc., operated from a switch which would connect or disconnect the light source circuit from a power source (such as 230 VAC at a frequency of 50 Hz). In this manual approach, the user needs to manually operate the switch in order to turn on the light sources. A more sophisticated approach is to automate such an action by using a presence, movement or similar type of sensor of any kind of technology like infrared, RF, etc. that can signal and/or operate on a switch that would connect or disconnect the light sources from the power source. In this way, depending on the user presence or movement, the sensor would send the signal to a switch through wire for the respective ON/OFF action or operate on an embedded switch that is in the same electrical circuit as the light sources' circuit. Similarly, for a more advanced system, the sensor would use a lighting or similar protocol, using specific technologies that could support sending dimming commands to light sources over a wired connection and change or affect the lighting lumen output that could be described as light dimming. This dimming could be step-less, real-time regulated by information or measurements and calculations done on the sensor hardware and software or a simple step-wise dimming. The aforementioned classic and advanced setups are shown in FIGS. 11A to 11D as reference.

As described and illustrated above, the concept of introducing an automated controlling sensing element into the system may require that in some way, the sensing element interrupts or is wire-connected to a device that interrupts the light group connection to the power supply. This translates to extra wiring effort, extra material used and practical inherent limitations to the placement of the sensing element, the switching element or the light source group. In the advanced case, where dimming functionality is also preferred in the application, an extra device may be required for applying the dimming functionality to the light source group, as well as dim compatible lighting sources. Additionally, the system is not flexible as it is bound to the existing wired connections, as possible modifications and/or extensions require that rewiring is made. For instance, for every change in the position of the sensing element, wire extensions or new wires should be placed and the main supply circuit needs to be changed. Also, the fact that the switching and dimming operations on the light source group is done from one point, this inherently implies that wiring of the light source group is limited.

Figure 12:
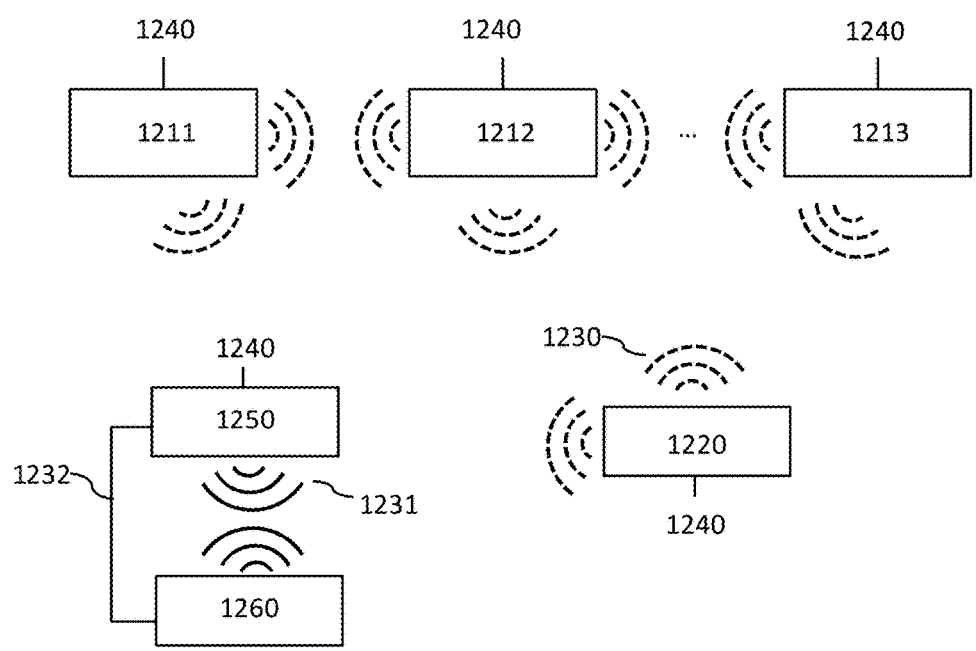

The problems described above, in particular with reference to the alternative embodiments of FIGS. 11A to 11D, can be solved with the approach described in connection with FIG. 12. FIG. 12 shows an alternative connected systems concept example. In particular, the reference signs in FIG. 12 indicate: 1211: light source no. 1; 1212: light source no. 2; 1213: light source no. N; 1220: sensor; 1230: 802.15.4; 1231: 802.11; 1232: optional Ethernet wired connection; 1240: power supply; 1250: configuration gateway; 1260: computing device.

First of all, individual power supply is considered for every light source in the group as well as the sensing element. This wards off the switching and dimming action from a central point to an ad-hoc consideration. Due to the fact, though, that these switching and dimming actions are preferably performed above through wired connections, an ad-hoc approach makes no sense anymore. For this reason, the wired connection should be substituted with a wireless connection, with or without the capability of mesh networking. Here, any secured, encrypted (for example AES encryption), connection-based wireless technology operating from the sub-GHz to the 2.4 GHz region (like Zigbee, Thread, Z-wave, or similar 802.15.4 technology) can operate in a sinful way. This type of solution requires that all end points (sensing element and light sources) individually support this wireless connectivity. In addition to that, the dimming functionality should be supported inherently in the lighting sources, not in a traditional way (like phase-cut or similar) but in a manner of PWM or analog diming directly acted on the light output. For the coordination of the wireless system, a gateway may be present that also should support the aforementioned wireless protocol as well as support a configuration interface in terms of a wired connection to a computing device (like a laptop or dock computer or similar) or a wireless connection of a different than the aforementioned technology (e.g. 802.11 Wi-Fi). An illustration of the above connected concept, including an N number of light sources and a sensing element, is shown in FIG. 12.

This concept mainly solves all of the aforementioned problems. Initially, the power source of each element in the system is individual. Switching and dimming action are given as wireless commands and no interruption is needed to the circuit. This eliminates the limitation of the wiring and wiring changes needed in the initial system installation, in case of system changes or extensions. Additionally, in case of a dimmable system, the state-of-the-art connected system has a dimmable connected light source so no additional external dimmer device is required.

A major limitation of this concept, though, is that the system setup and configuration is done by a central device, acting as a gateway between the configuration computing device and the system. Without this device, the system can neither be installed and/or configured nor operated.

Figure 13A:
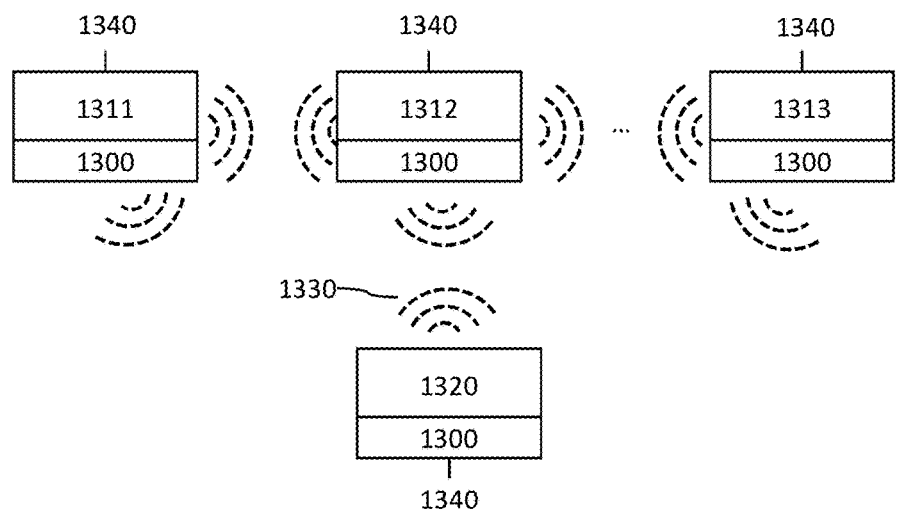
FIGS. 13A, 13B, 14A, 14B, 15A, 15B, 16A, 16B, 16C, 17A, 17B, 17C show exemplary embodiments of a lighting system, a method, a light source and/or a sensor as described herein.
Figure 13B:
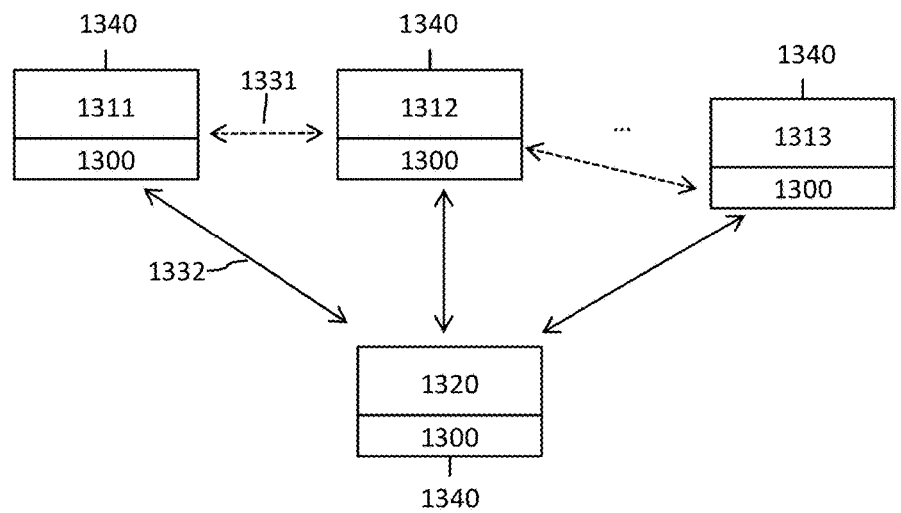

FIGS. 13A and 13B show exemplary embodiments of the lighting system described herein. FIG. 13A shows a new connected concept with element user interface example. FIG. 13B shows a new concept topology. Reference signs in FIGS. 13A and 13B show: 1300: user interface; 1311: light source no. 1; 1312: light source no. 2; 1313: light source no. N; 1320: sensor; 1330: 802.15.4; 1340: power supply; 1331: connection-less link; 1332: Connection-based link.

The proposed system according to FIG. 13A is a simplified connected system, which gets rid of the gateway device and the configuring computing device, keeps the wireless backbone communication structure and introduces a different way to install and configure the system just by using the user interface provided from its connected elements in the system (light sources and sensing elements).

The aforementioned system comprises at least one sensing element of any sensing technology (e.g. infrared, RF, etc.) whose main operation is to sense user presence, movement or any indication or measurement that has to do with human interaction. Additionally, the sensing element may have other measurement devices embedded on it which measure other environment variables (e.g. room light value, temperature, sound and others) and use the measured values in its calculations. The core hardware of the sensing element will include at least one processing element (microcontroller with or without extended functionality like RF transmitters, memory peripherals, temperature peripherals, etc.). If not included in its core functionality, the sensing element should include at least one hardware device which will be able to implement the aforementioned protocols enabling its wireless communication with the rest of the system elements. This device can come inherently into the actual design of the sensing element or come as a discrete part providing that an interface is used between it and the processing unit of the sensing element in order to be able to communicate with each other.

The user interface of the sensing element optionally has all the user interface required for the core sensing element, for example potentiometers, buttons etc., that only affect the core sensing functionality and have nothing to do with the wireless network interaction. This user interface is optional and may also not be present, in case the sensing functionality does not need it.

The user interface used for the wireless network functionality may come in the form of a pressable button, capacitive touch button, NFC tag with simple functionality, etc. in order to receive user input in regards to the wireless functionality. The form of this button can be so that the sensing element successfully recognizes different kind of commands. For example, if a pressable button is used, the core computing hardware of the sensing element should be able to distinguish "short presses" and "long presses" and be able to count them.

The user interface of the sensing element may also provide to the user a way to distinguish between the different modes that are currently the status of the sensing element. In this application, a simple LED point is used to designate in which state the sensing element currently is.

The sensing element's user interface may be used to:
enable/disable pairing mode (from 1 second to 10 seconds "long press"—in this application at least 4 seconds "long press");
enable/disable testing mode (from 1 time to 10 times "short press"—in this application is 4 times "short press");
bring the master sensing element to a reset status and dismantle the network. (from 1 time to 10 times short press
in this application 10 times "short press"); and/or
enable/disable features (from 1 time to 10 times "short press"—in this application and OFF feature is 4 times "short press").

The other end of the system wireless connection is the light sources. These light sources can be any type of lamps, bulbs, luminaires, tubes, panels, etc. of any technology type classic, LED, etc. that can host and implement a wireless functionality of the aforementioned kind and optionally be of the PWM or analog dimmable type. A phase cutting type is not preferred but could also be possible. The wireless functionality of the light source is enabled by the use of an inherent hardware piece together with is firmware that implements the wireless functionality or by the use of a discrete module that does the exact same thing and interface with the light source hardware with the use of a communicating interface. The light source should have either a discrete processing unit to be able to process the user input coming from the following user interface or utilize the processing power of the wireless hardware piece to receive user input.

The user interface of the light source can come at exactly the same specification as with the sensing element. It can be an actual pressable button, capacitive touch button, NFC tag, etc, with the only requirement that it should be in such a form that the processing unit of the light source can distinguish between different user input from the same interface. For example, if a pressable button is used, the processing unit of the light source should be able to distinguish between "short presses" and "long presses" and also be able to count them.

The light source's user interface may be used to:
enable/disable pairing mode (from 1 second to 10 seconds "long press"—in this application it is not applicable);
enable/disable testing mode (from 1 second to 10 seconds "short press"—in this application it is not applicable);
enable/disable features (from 1 time to 10 times "short press"—in this application and OFF feature is 4 times "short press"); and/or
bring the light source into reset status and unpair from sensing element (from 1 second to 10 seconds "long press").

In the system described in this document, the sensing element preferably always represents the unique master of the network whose role is to process user input, calculate based on its sensing functionality and measurement capabilities and send light related commands to the clients. The light sources represent the clients that receive these commands and act upon them. The connection between the unique master sensing element and its multiple client light source is particularly described with reference to the figures.

For every distinct system only one sensing element can be present and active in the network. The network topology is shown in FIG. 13B.

In general, the system, in particular the substitube T8 advanced UO connected system, may comprise a single presence sensor and a collection of Substitube T8 Zigbee connected tubes. The sensor communicates with the tubes via ZigBee and it gives commands for ZigBee ON/OFF and ZigBee DIM-UP and DIM-DOWN. The commands may be triggered by physical presence (DIM-UP to max 100%; depends on daylight setting) and lack of presence time-out (DIM-DOWN to 20%).

Figure 14A:
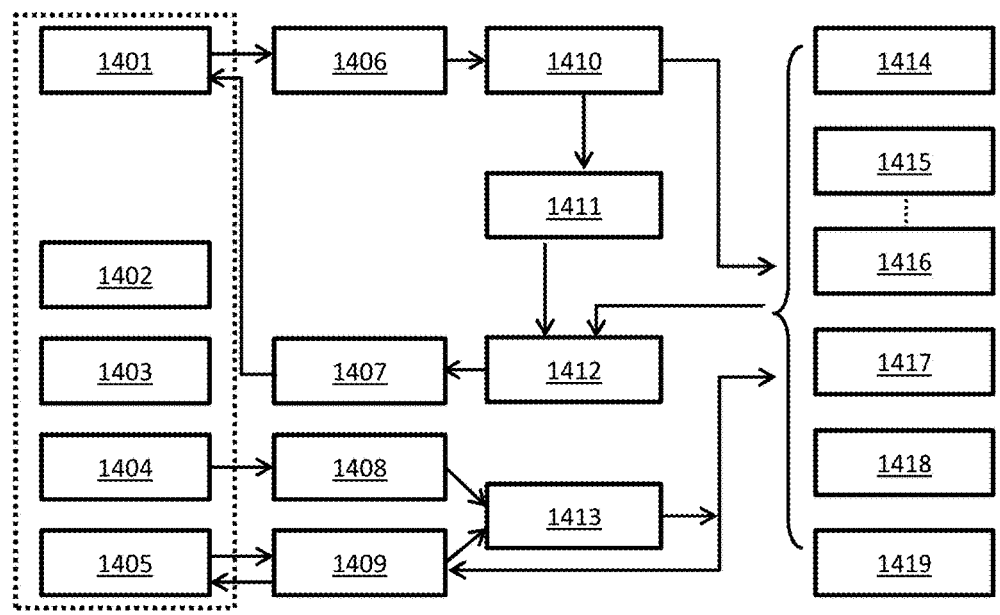

FIG. 14A shows an exemplary embodiment of a block diagram description of the firmware implemented on the module, in particular the wireless control module. Here, reference signs in FIG. 14 indicate: 1401: antenna; 1402: VCC; 1403: GND; 1404: button pin; 1405: UART; 1406: RF receiver; 1407: RF transmitter; 1408: button handler; 1409: RF/sensor COM handler; 1410: command demodulator module; 1411: network management module; 1412: command response module; 1413: user interface handler; 1414: lamps control engine; 1415: pairing engine; 1416: feedback LED handler; 1417: presence sensing handler; 1418: reset to FN handler; 1419: twilight function handler.

Figure 14B:
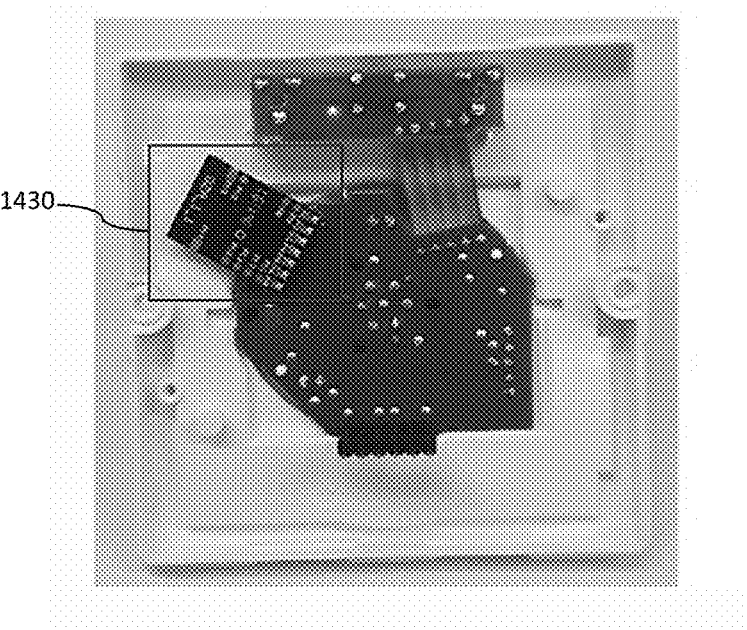

FIG. 14B shows the location of the ZigBee module on the sensor (reference sign 1430). The location is similar for all different types of sensors, in particular all three types of sensors as described below. The position is shown only for the CR below.

Figure 15A:
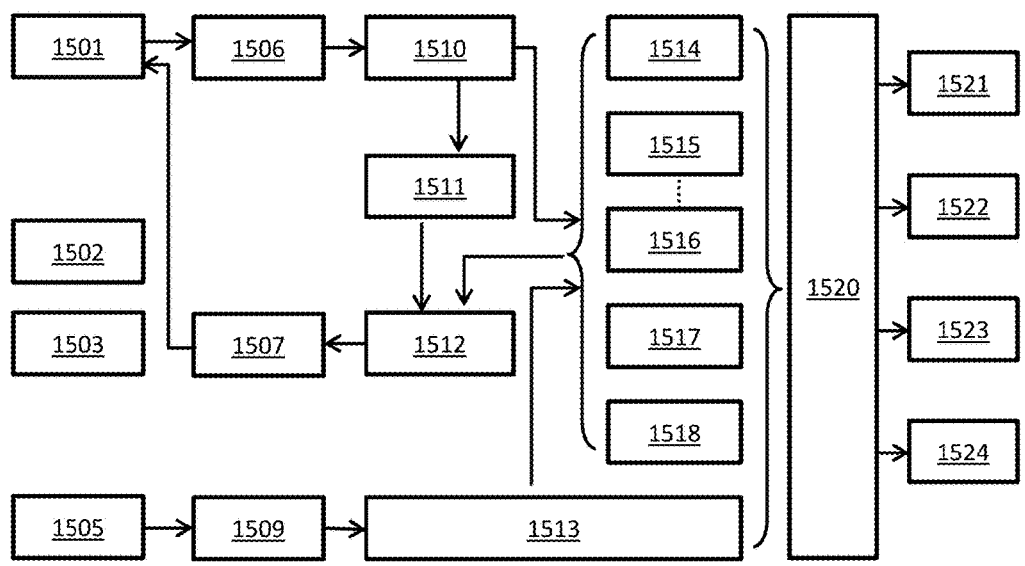

FIG. 15A shows an exemplary embodiment of a block diagram description of the firmware implemented on the module. Here, reference signs in FIG. 15 indicate: 1501: antenna; 1502: VCC; 1503: GND; 1505: ADC pin; 1506: RF receiver; 1507: RF transmitter; 1509: ADC detector; 1510: command demodulator module; 1511: network management module; 1512: command response module; 1513: ADC handler (button or OTP function); 1514: on/off handler; 1515: level change handler; 1516: CCT change handler; 1517: color change handler; 1518: reset handler; 1520: pulse-width modulation (PWM) generator module; 1521: PWM1; 1522: PWM2; 1523: PWM3; 1524: PWM4.

Figure 15B:
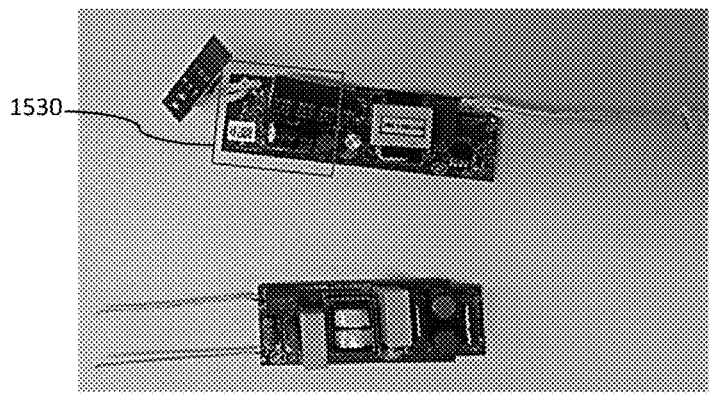

FIG. 15B shows the position of the ZigBee module below two E-caps (i.e. two capacitors). In particular, the position of the ZigBee module may be on top of one of the LED driver PCBs placed in the endcap that hosts the tube reset button. The ZigBee module is purchased as a discrete SMD component and placed and soldered in carefully aligned solder pads.

It should be noted here that on the ZigBee module shown in FIG. 15B, the antenna is a copper trace on-board antenna. The influence from the neighboring elements, components and materials can be from severe to non-acceptable. For this reason, taking also into account the limited PCB space, components are placed in a distance from the on-board antenna.

Figure 16A:
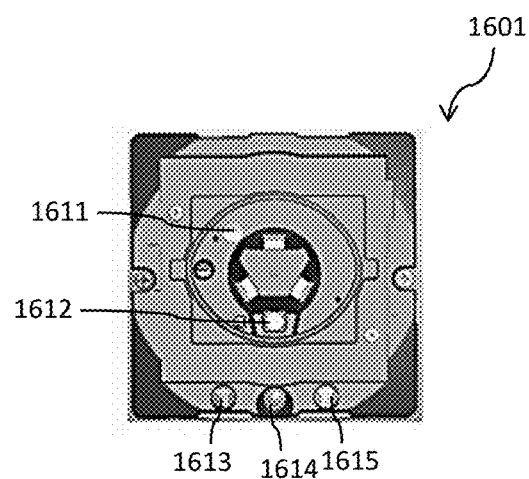
Figure 16B:
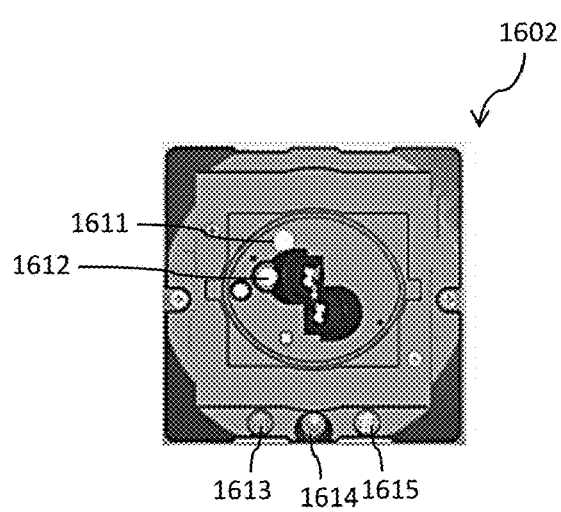
Figure 16C:
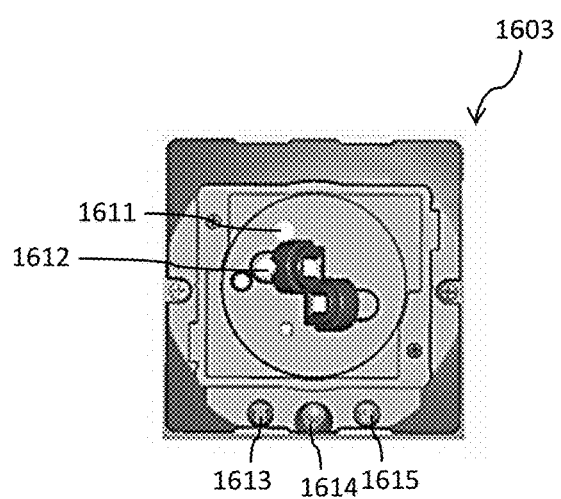

FIGS. 16A, 16B and 16C show different sensor types and their configuration. Reference signs indicate: 1501: sensor ST8 CR; 1602: sensor ST8 RT; 1603: Sensor ST8 HB; 1611: green LED; 1612: daylight sensor; 1613: daylight threshold setting potentiometer; 1614: push button; 1615: delay setting potentiometer.

The sensor detects temperature contrast of moving (human) body to environment. The product range for this application comprises three sensor (head) types:

1. Sensor ST8 CR (2.5 m to 4 m mounting height), diameter 40 m;
2. Sensor ST8 RT (2.5 m to 5 m mounting height), 20×4 m;
3. Sensor ST8 HB (4 to 14 m mounting), 30×4 m.

The interface of the sensor with the user (sensor user interface) is: a green status LED (providing optical feedback to the user); a daylight threshold setting potentiometer (to enable/disable the sensor dim-up function); a delay setting potentiometer (to set the hold-on delay after presence has disappeared); and a push button (to pair/unpair and test network members).

The status LED (green LED) is used to notify the user about the current status of the sensor. The light intensity of the status LED is strong enough to be seen from inside the plastic sensor head lens in a lit room. The daylight sensor element is measuring the ambient light around the sensor and the value is used for the dimming algorithm. The daylight threshold potentiometer (also called: daylight threshold setting potentiometer) sets the threshold value of the daylight setting. The "darker" the setting the more difficult for the DIM-UP action to reach 100% of the dim value. The "lighter" the setting, the easier for the DIM-UP action to reach 100% of the dim value. The daylight threshold potentiometer has a range between 2-1000 lux. The daylight threshold potentiometer is preferably not used for daylight control, but rather only to setup the threshold upon which the sensor acts and decides if it needs to dim up or not the tubes on movement or presence sensing. The delay setting potentiometer is used to set a delay between 5 s and 15 min between the time when the presence is not detected anymore and the time when the tubes dim-down (DIM-DOWN command is sent to the tubes). The push button is used to bring the sensor into pairing mode, test mode and total network reset (during button press, all sensing functions are preferably deactivated).

Figure 17A:
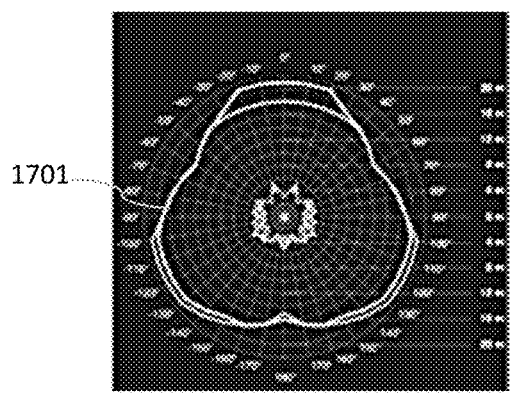
Figure 17B:
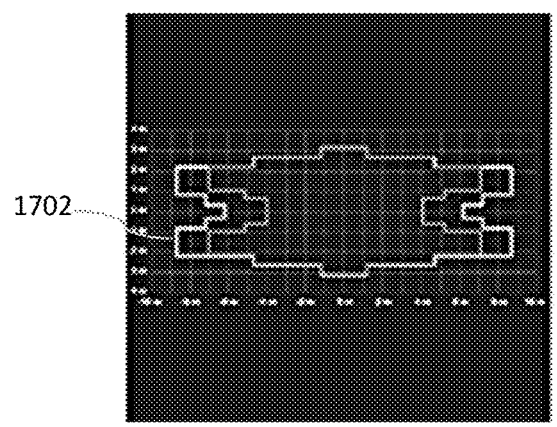
Figure 17C:
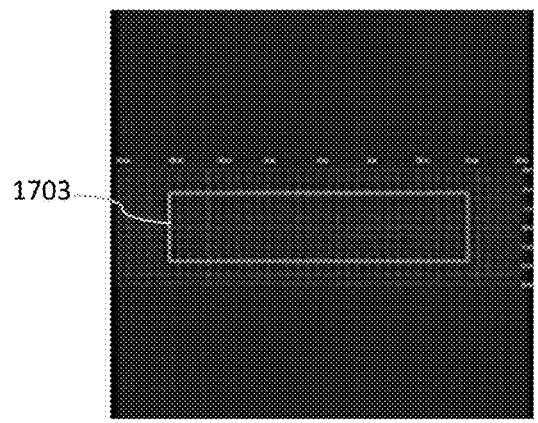

FIGS. 17A, 17B and 17C show sense ranges for the three sensor types as described above in connection with FIGS. 16A, 16B and 16C. Reference signs denote: 1701: sense range sensor ST8CR; 1702: sense range sensor ST8RT; 1703: sense range sensor ST8HB.

Further technical characteristics of the different sensor types are summarized in the following table 3:

TABLE 3

(technical characteristics)

| | ST8 CR | ST8 RT | ST8 HB |
|---|---|---|---|
| Sensor type | Passive infrared | Passive infrared | Passive infrared |
| Input voltage (V) | 230 V @ 50/60 Hz | 230 V @ 50/60 Hz | 230 V @ 50/60 Hz |
| Input power (W) | <1 W | <1 W | <1 W |
| Installation height (m) | 2.5-4 | 2.5-5 | 4-12 |
| Luminosity setting (lx) | 2-2000 | 2-2000 | 2-2000 |
| Time delay setting (-) | 5 sec-15 min | 5 sec-15 min | 5 sec-15 min |
| Degree of protection | IP54 | IP54 | IP54 |

In the following, a testing process of the lighting system described herein is described in detail. The testing process includes network functionality related tests and normal operation related tests. Both of them are may be of the same importance but they are split into two logical categories so as to be easier to draw conclusions on their success or not. The tests are described in steps and the expected or required result is also expressed precisely in the end.

The tests are preferably conducted with all sensor types and all tube types. The main hardware PCB in the sensor is eventually the same in all three types as well as the Zigbee module placement. In effect, the RF behavior of the sensor will be much similar or even the same. The tests are preferably conducted in an environment where no other test objects rather than the objects involved in these tests should be electrified, or in pairing mode, or in factory mode or in testing mode. In the opposite case, there could be the risk that the test will falsely succeed or falsely fail due to the interaction of the test objects with external non-test objects. If such a test setup is not possible, direct metal presence in the near vicinity of the sensor and tubes is not wanted and should be minimized.

Preferably, during pairing mode of the sensor, the test function and the OFF feature toggling are disabled. In this way, the tube pairing feedback of the tubes is not disturbed by the tube test blinking or the OFF feature blinking.

Network Related Tests:

The network related tests relate to the network functionality and connection between the sensor and its connected tubes. They comprise:
1. Sensor network creation and automatically adding factory default tubes;
2. Testing the network presence and tube population;
3. Network group destruction initiated by sensor;
4. Tube joining existing sensor network;
5. Group of tubes joining existing sensor network;
6. Tubes losing sensor network (sensor is defect or unreachable);
7. Tube disconnection from sensor;
8. Paired tube physically removed from network and brought back again.

The steps may be conducted in the order specified or in another order.

Sensor Network Creation and Automatic Joining of Factory Default Tubes:

The following scenarios apply: initial system placement and/or sensor replacement. In this test, the pairing functionality of a group of tubes, which are in factory default mode (unpaired or not joined to any network), with the sensor is tested. The process and result are as follows:
1. Electrify sensor and empty luminaire;
2. Adjust potentiometer settings to the medium value;
3. Press the sensor push button using LONG press (4 sec) and power cycle the tubes only (to re-enable ZigBee pairing window). Sensor enters pairing mode. Result: Status LED should start blinking while sensor is in pairing mode.
4. Start installing the tube into the luminaires. Factory default tubes or tubes that are not in any network currently will join the newly created sensor network. Result: After pairing the tubes will dim-down to 20% for the user to recognize and confirm the joining of the lamp to the network.
5. In order to revert the sensor status from pairing mode back to normal mode (where all sensing functions are activated), the button need to be pressed again using LONG press. The pairing mode of the sensor is timed by using a time window of 50 minutes. This means that the pairing mode will automatically expire after the time window has passed and the user hasn't pressed again the push button using LONG press. Result: Status LED will stop blinking in either case when the pairing mode is exited.

Testing the Network Presence and Tube Population:

The following scenarios apply: confirm the right network pairing and/or distinguish between network groups at a later time. This test provides a feedback to the user on whether the tubes truly joined a specific sensor network as well as which exactly tubes are present in the sensor network. The process is as follows:
1. Electrify sensor (Sensor should have already initiated a network and have at least one tube joined to it);
2. SHORT press (max 0.5 s) the push button two times (2×);
3. Sensor enters testing mode (all sensor functions are deactivated). Result: All tubes that belong to the sensor network will start blinking;
4. To end testing mode (reenter normal mode with all sensor functionality active) SHORT press the sensor push button two times (2×). Result: Tubes will stop blinking;
5. The sensor testing mode operates using a time window of 60 seconds. Result: If sensor testing mode is not exited via SHORT pressing the sensor push button two times then it will end automatically after the time window expires.

Network Group Destruction Initiated by the Sensor:

This test involves sensor replacement as a testing scenario. This test is done solely at the sensor and its purpose is to confirm the network destroy functionality of the sensor. The process is as follows:
1. Electrify the sensor (sensor should have already initiated a network and have at least one tube joined to it);
2. Conduct the test: "Testing the network presence and tube population" to verify that the already connected tubes react to the sensor network.
3. SHORT press (less than 0.5 second) the sensor push button ten times (10×);
4. Sensor practically dismantles the network after 30 seconds, loses the network key and all previously connected tubes are returned to their unpaired status or factory default mode;
5. Conduct the test: "Testing the network presence and tube population" to verify that the previously connected tubes no more react to the sensor network. Result: No tubes will blink;
6. Conduct the test "Sensor network creation and automatic joining of factory tubes" in order to verify that pairing still functions after network destruction.

Destructing the network group from the sensor, while the tubes are off or out of range might result to an "end-point-zombie" status of the tube, where the tube will remain at a network that was previously destructed by the sensor. In order to resolve the problem, each tube much be reset individually using the button on it. The same situation can happen when the sensor is broken and not-operational before destructing the network group. Again, the tubes need to be reset individually using the button in order for them to be able to be paired again.

Tube Joining Existing Sensor Network:

This scenario particularly applies when a tube is to be replaced. This test proves the functionality of a factory default tube joining an already existing sensor network with already existing tubes present in the network. The process is as follows:
1. Electrify the newly to-be-connected tube;
2. Electrify the sensor and already connected tubes;
3. Conduct the "Testing the network presence and tube population" in order to firmly distinguish between the already connected tubes and the newly to-be-connected tube.
4. LONG press (4 seconds) the sensor push button in order to bring the sensor to pairing mode (sensing functions are deactivated) and bring the newly to-be-connected tube to the network. Result: The newly connected tube will dim-down to the lowest value in order for the user to confirm the pairing of the tube to the sensor.

5. Conduct the "Testing the network presence and tube population" in order to confirm the joining of the new tube to the sensor network.

Group of Tubes Joining Existing Sensor Network:

One scenario that applies is the replacement of a group of tubes. This test proves the functionality of a group of factory default tubes joining an already existing sensor network with already existing tubes present in the network. The process is as follows:

1. Electrify the newly to-be-connected group of tubes;
2. Electrify the sensor and already connected tubes;
3. Conduct the "Testing the network presence and tube population" in order to firmly distinguish between the already connected tubes and the newly to-be-connected group of tubes;
4. LONG press (4 sec) the sensor push button in order to bring the sensor to pairing mode (sensing functions are deactivated) and bring the newly to-be-connected group of tubes to the network. Result: The group of newly connected tubes will dim-down to the lowest value in order for the user to confirm the pairing of the tubes to the sensor.
5. Conduct the "Testing the network presence and tube population" in order to confirm the joining of the new group of tubes to the sensor network.

Tubes Losing Sensor Network:

This testing scenario might be required if a sensor loses power or is broken. This test is conducted in order to prove the right functionality in case one or more sensor-connected tubes lose the connection to their sensor (Due to sensor or network malfunction). The test process is as follows:

1. Electrify the sensor and its connected tubes (The sensor-tubes group should have already be formed in one network);
2. Conduct the "Testing the network presence and tube population" in order to confirm that the sensor-tubes group is connected to one network;
3. De-electrify the sensor;
4. The tubes will recognize loss of sensor after a maximum of 15 minutes. Result: The tubes will dim-up to 100% of the dimming level.
5. Electrify the sensor.
6. The sensor becomes operational again or comes into range. Result: The tube preferably goes back to their previous mode of operation with the same dimming level as before.

Tube Leaving Network:

This scenario applies if the tube needs to be moved to a different network group. This test proves the successful disconnection of a tube from a sensor network. The reason for the tube to leave a sensor network is in order to be switched to a different network or in general removed from the network and be brought back to factory default mode. The process is as follows:

1. Electrify the sensor and the tube.
2. LONG press (at least 4 sec) the push button located on the endcap of the tube. Result: The tube will flash once.
3. Conduct the "Testing the network presence and tube population" in order to confirm that the tube has left network.

Paired Tube Physically Removed from Network and Brought Back Again:

This test is conducted in order to prove the right functionality in case a tube is switched off temporarily or going out of range and brought back in again. It involves the steps:
1. Electrify the sensor and its connected tubes (The sensor-tubes group should have already be formed in one network);
2. Conduct the "Testing the network presence and tube population" in order to confirm that the sensor-tubes group is connected to one network.
3. De-electrify one tube.
4. Wait a minimum of 15 minutes.
5. Re-electrify the tube. Result: The system should work as before.
6. De-electrify the sensor and the rest of the tubes.
7. Wait a minimum of 15 minutes.
8. Re-electrify the sensor and tubes. Result: The system should work as before.

Normal Operation Related Tests:

The test scenarios further comprise normal operation related tests. The normal operation of the sensor-tube configuration refers to the DIM-UP and DIM-DOWN action depending on the presence sensing or the time-up of the absence of presence. Depending on the delay and daylight threshold setting also, the normal operation changes and this is subject to test too. The normal operation related tests comprises the steps:

1. Normal presence detection at three time delay (hold-off) settings
2. Normal presence detection at normal room light and three daylight settings
3. Matrix test 2-channel (50 tubes)
4. Matrix test 1-channel (25 tubes)
5. Corridor test 2-channel (50 tubes)
6. Corridor test 1-channel (25 tubes)
7. Network congestion measurement ("node pile" of maximum 50 tubes)

The individual test steps are described above or below. In all tests, at least one sensor and a sufficient amount of paired tubes are involved. It is assumed that the test group items are already paired and ready to be operated. By default, both threshold settings are set to the middle values.

Normal Presence Detection at Three Time Delay (Hold-Off) Settings:

This test proves the proper functionality, in particular with regard to normal operation or standard usage, of the sensor with different time delay settings on the time delay setting potentiometer. Initially the time delay setting on the potentiometer should be at the middle value. The sensor is preferably enclosed in a four-walled box (bottom side is on the table and upper ceiling is on air) so that the only way for the presence sensor to be activated is to pass something on top of the box with a move that can be recognized by the sensor. The test process is as follows:

1. Adjust the daylight threshold value to the most right position (To ensure that the tubes will definitely dim-up when presence is detected).
2. Adjust the time delay setting on the sensor at the middle value.
3. Put the sensor in the four-walled box.
4. Electrify the sensor and tubes.
5. Trigger the presence sensor by passing an object above the box with the open ceiling. Result: The tubes are dimmed-up.
6. Measure the time difference between the time point when the tubes dim-up until the time point when the dim-down again.
7. De-electrify the group.
8. Adjust the time delay setting potentiometer to a value at the left.
9. Electrify the group.
10. Trigger the presence sensor by passing an object above the box with the open ceiling. Result: The tubes are dimmed-up.

11. Measure the time difference between the time point when the tubes dim-up until the time point when the dim-down again. Result: The time is preferably less than on the previous test.
12. De-electrify the group.
13. Adjust the time delay setting potentiometer to a value at the right.
14. Electrify the group.
15. Trigger the presence sensor by passing an object above the box with the open ceiling. Result: The tubes are dimmed-up.
16. Measure the time difference between the time point when the tubes dim-up until the time point when the dim-down again. Result: The time is preferably more than on the first test.

Normal Presence Detection at Normal Room Light and Three Daylight Settings:

This test proves the proper functionality, in particular with regard to normal operation or standard usage, of the sensor with different daylight threshold settings on the daylight threshold setting potentiometer in an adequately artificially lit room. Initially the daylight threshold setting on the potentiometer is preferably at the middle value. The sensor is preferably enclosed in a four-walled box (bottom side is on the table and upper ceiling is on air) so that the only way for the presence sensor to be activated is to pass something on top of the box with a move that can be recognized by the sensor. Also, the open ceiling allows the artificial light of the room to pass through and get captured by the daylight sensing element on the sensor. The test process is as follows:
1. Adjust the time delay setting value to the most left position (To ensure that the tubes will dim-down after the test quickly and allow the test to be conducted in a shorter time).
2. Adjust the daylight threshold setting on the sensor at the middle value.
3. Put the sensor in the four-walled box.
4. Electrify the sensor and tubes.
5. Trigger the presence sensor by passing an object above the box with the open ceiling. Result: The tubes are dimmed-up (Assuming that the light passing through to the sensor is not too much).
6. If the tubes are not dimmed up, reduce the external light source until and repeat the steps until the tubes are dimmed-up after presence detection.
7. De-electrify the group.
8. Adjust the daylight threshold potentiometer to a value at the most left.
9. Electrify the group.
10. Trigger the presence sensor by passing an object above the box with the open ceiling. Result: The tubes preferably will NOT dim-up. The daylight threshold setting should "inform" the sensor that the external light that is sensed by the daylight sensing element is enough and therefore the tubes need not be dimmed-up after presence detection.
11. De-electrify the group.
12. Adjust the daylight threshold setting potentiometer to the middle value.
13. Increase the external light source.
14. Electrify the group.
15. Trigger the presence sensor by passing an object above the box with the open ceiling. Result: The tubes should no dim-up. If yes, increase the external light source further and retry the steps until the tubes do not dim-up.
16. De-electrify the group.
17. Adjust the daylight threshold setting potentiometer to a right most value.
18. Electrify the group.
19. Trigger the presence sensor by passing an object above the box with the open ceiling. Result: The tubes should dim up.

With reference to the exemplary embodiments shown in FIGS. 18A, 18B, 18C, 18D, 19 and 20, different test sequences for the lighting system described herein will be described in detail.

Figure 18A:
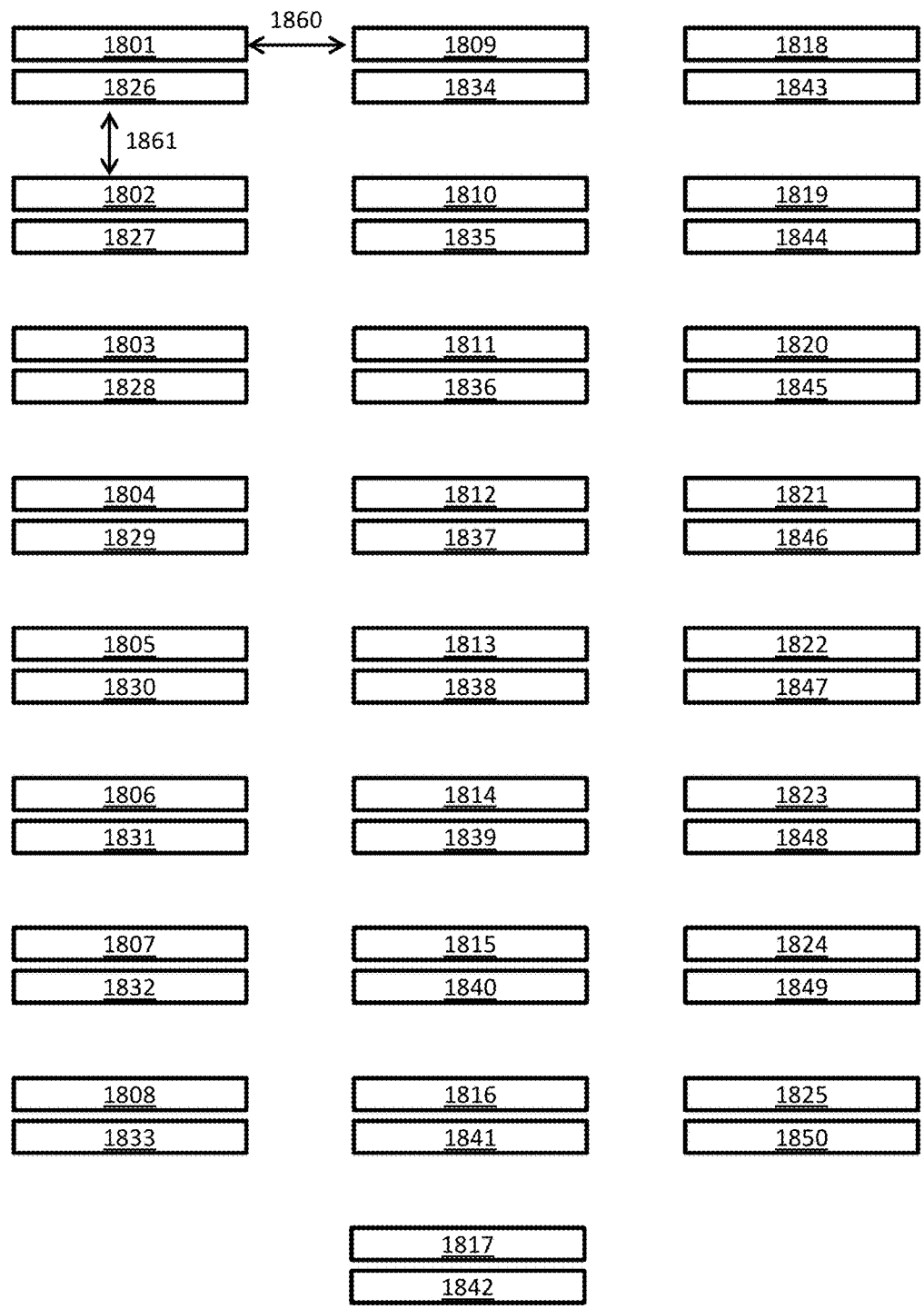
FIGS. 18A, 18B, 18C, 18D, 19 and 20 show test configurations and/or test sequences for a lighting system, a method, a light source, and/or a sensor as described herein.
Figure 18B:
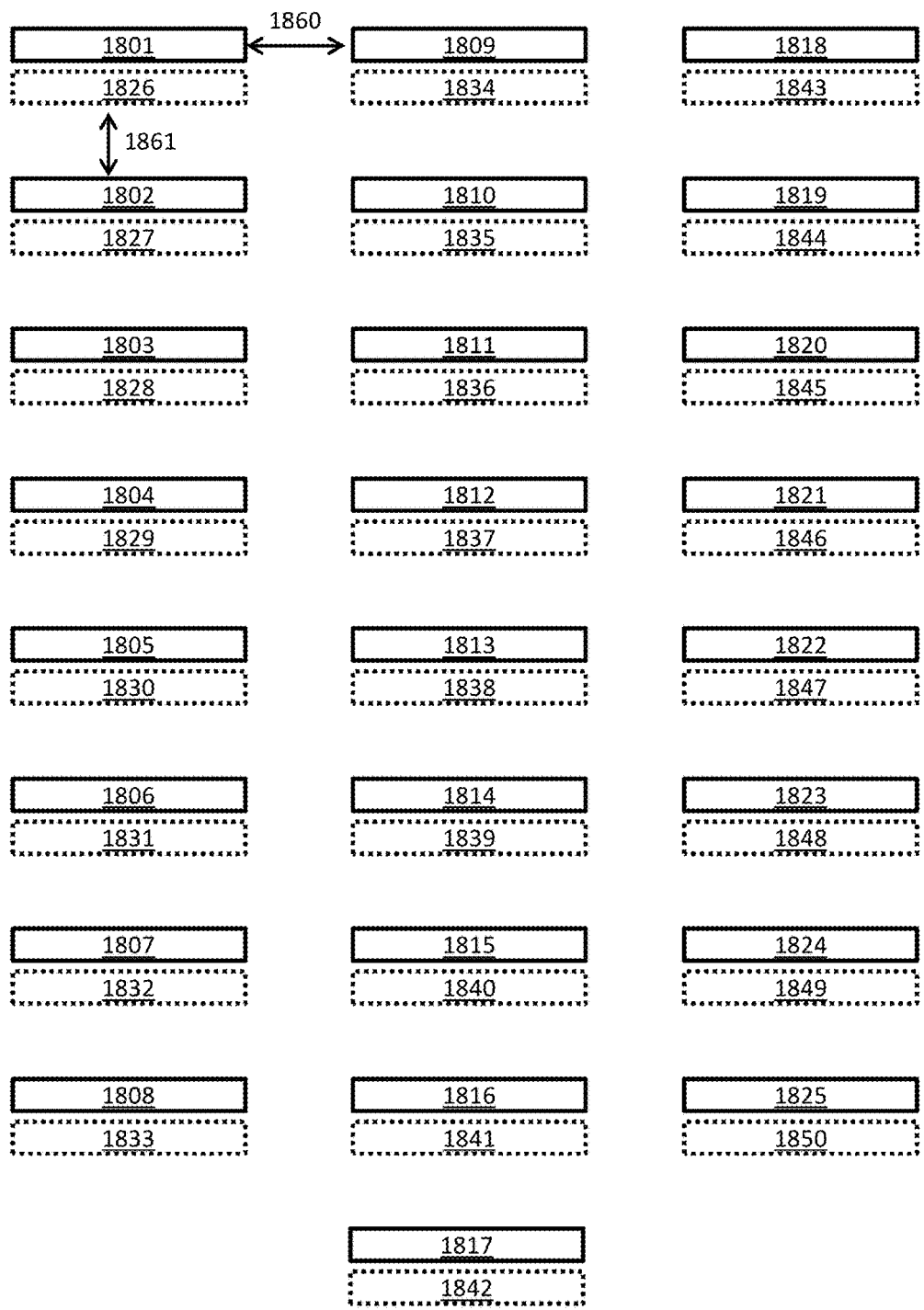
Figure 18C:
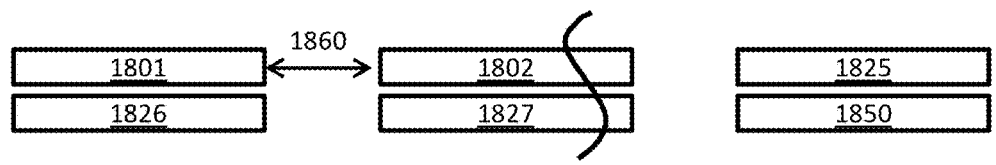
Figure 18D:
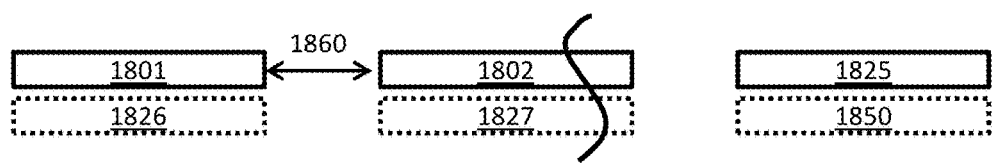

FIG. 18A shows a configuration for a "2-channel matrix test" with 50 tubes. FIG. 18B shows a configuration for a "1-channel matrix test" with 25 tubes. FIG. 18C shows a configuration for a "2-channel corridor test" with 50 tubes. FIG. 18D shows a configuration for a "1-channel corridor test" with 25 tubes.

Reference signs in FIGS. 18A, 18B, 18C and 18D indicate: 1801 ( . . . ) 1850: tube no. 1 ( . . . ) tube no. 50; 1860: distance of 1 m; 1861: distance of 2 m.

The test with the configuration according to FIG. 18A is preferably performed with an ST8 CR sensor. This test is used to represent a reference application. The number of tubes is maximum and the setup reflects a 25 luminaire setup with 2 channel luminaires. The test setup is an 8×3+1 matrix and the distance between the luminaires is 2 m in the long side and 1 m in the short side.

The test process for the test with the configuration shown in FIG. 18A may be as follows:
1. Place sensor delay potentiometer to the left most position (5 seconds)
2. Place sensor daylight threshold potentiometer to the right most position (high environment light demanded)
3. Make sure tubes are not inside the luminaires, luminaires and sensor are connected to the same switch.
4. Electrify sensor and empty luminaires.
5. Put sensor in pairing mode (long press sensor button for at least 4 seconds).
6. Start inserting the factory-default tubes one by one. For every tube that is inserted into the socket, it is powered up, paired to the sensor and dimmed down to 20% to indicate that is paired. Repeat for every tube until all tubes are inserted, paired and dimmed down.
7. Remove sensor pairing mode (Long press the sensor button again for at least 4 seconds). Result: Observe if the tubes dim up to 100% after 5 seconds homogenously.
8. Put the sensor in testing mode (short press the sensor button 2 times). Result: All paired tubes should start blinking every 1 second homogenously. The precise timing of the blinking of all tubes is not a requirement. It is expected that not all tubes blink at exactly the same time instant.
9. Remove sensor testing mode (Short press 2 times sensor button). Result: All paired tubes will stop blinking go to 20% and after 5 seconds end up in a homogenous 100% dimming state.
10. Cover sensor with a solid box, not allowing any infrared come into the sensor head. Result: After 5 seconds the tubes will dim down to 20%.
11. Uncover sensor. Result: the tubes should dim up to 100%.
12. Enable OFF feature (By default it is disabled) (Short press the sensor button 4 times). Result: The tubes will turn off (standby power) for 2 seconds. After that they will go to 20% and then after 5 seconds to 100%. All tubes should have at all stages uniform dim status.
13. Cover sensor and wait for 15 minutes. Result: Tubes will turn off (standby power).
14. Uncover sensor. Result: Tubes will go to 100%.

15. Disable OFF feature (Short press sensor button for 4 times). Tubes will blink for two times and then go to 20% and after 5 seconds to 100%.
16. Cover sensor and wait for 15 minutes. Result: Tubes will go to 20% after 5 seconds and stay there until presence is again detected, but they will not go off.
17. Set sensor daylight threshold potentiometer to the far left position.
18. Put the sensor in testing mode (Short press 2 times the sensor button). Result: All paired tubes should start blinking every 1 second homogenously. The precise timing of the blinking of all tubes is not a requirement. It is expected that not all tubes blink at exactly the same time instant.
19. Remove sensor testing mode (Short press 2 times sensor button). Result: All paired tubes will stop blinking and end up in a homogenous 20% dimming state.
20. Cover sensor with a solid box, not allowing any infrared come into the sensor head. Result: The tubes will remain to a dimming status of 20%.
21. Uncover sensor. Result: the tubes should stay at a dimming status of 20%.
22. Enable OFF feature (By default it is disabled) (Short press the sensor button 4 times). Result: The tubes will turn off (standby power) for 2 seconds. After that they will go to 20% and stay at this dimming level. All tubes should have at all stages uniform dim status.
23. Cover sensor and wait for 15 minutes. Result: Tubes will turn off (standby power).
24. Uncover sensor. Result: Tubes will go to 20% and stay on this dimming status.
25. Cover sensor again and wait for 15 minutes. Result: Tubes will turn off (standby power).
26. Remove sensor power either by disconnecting the 230V wires supplying it or by removing the sensor head and wait for 15 minutes. The tubes should go to 100% to resemble the security feature when the sensor is lost.
27. Disable OFF feature (Short press sensor button for 4 times). Tubes will blink for two times and then go to 20% and stay on this dimming status.
28. Cover sensor and wait for 15 minutes. Result: Tubes will remain to 20% but they will not go off.
29. Remove sensor power either by disconnecting the 230V wires supplying it or by removing the sensor head and wait for 15 minutes. The tubes should go to 100% to resemble the security feature when the sensor is lost.
30. Reconnect the sensor and put it in testing mode to secure successful network rejoin. Result: Tubes should go to 20% right away or after sensor trigger.
31. Remove power from only one tube and perform the test function and normal sense function of the sensor. Result: The rest of the system should operate as above.
32. Reconnect the disconnected tube and perform the sensor test and normal sense mode. Result: The newly connected tube should follow the rest of the system.
33. Reset one tube, disconnect it from mains, put sensor in pairing mode and connect the tube to power. Then check the sensor test mode and normal presence mode. Result: Tube should successfully pair and follow the rest of the system operation.
34. Destroy network from the sensor (Short press the sensor button 10 times). Result: The sensor LED will turn on for some seconds and after 30 seconds the tubes will blink once to indicate successful unpair from the network and go to 100%.
35. If the tubes carry the newest firmware with the extended pairing window, then switch off tubes only, put sensor in pairing mode and switch on the tubes. Result: After maximum 5 minutes all tubes should pair to the sensor all at once.

The test with the configuration according to FIG. 18B is preferably performed with an ST8 CR sensor. The test with the setup of FIG. 18B is used to represent a reference application. The number of tubes is half of the maximum and the setup reflects a 25 luminaire setup with 1-channel luminaires. The test setup is an 8×3+1 matrix and the distance between the luminaires is 2 m in the long side and 1 meter in the short side. The same setup as the previous test is shared but the excessive 25 tubes are just switched off. The test process for the test with the configuration of FIG. 18B may the same process as the above 35-step-process described in connection with FIG. 18A.

The test with the configuration according to FIG. 18C is preferably performed with an ST8 RT and/or an ST8 HB sensor. This test is used to represent a reference corridor application. The number of tubes is maximum and the setup reflects a 25 luminaire setup with 2-channel luminaires. The test setup is a 1×25 linear setup and the distance between the luminaires is 1 meter in the short side. The test process for the test with the configuration of FIG. 18C may the same process as the above 35-step-process described in connection with FIG. 18A.

The test with the configuration according to FIG. 18D is preferably performed with an ST8 RT and/or an ST8 HB sensor. This test is used to represent a reference corridor application. The number of tubes is half of the maximum and the setup reflects a 25 luminaire setup with 1 channel luminaires. The test setup is a 1×25 linear setup and the distance between the luminaires is 1 meter in the short side. The same setup as the previous test is shared but the excessive 25 tubes are just switched off. The test process for the test with the configuration of FIG. 18D may the same process as the above 35-step-process described in connection with FIG. 18A, wherein the 35th step is optional.

Figure 19:
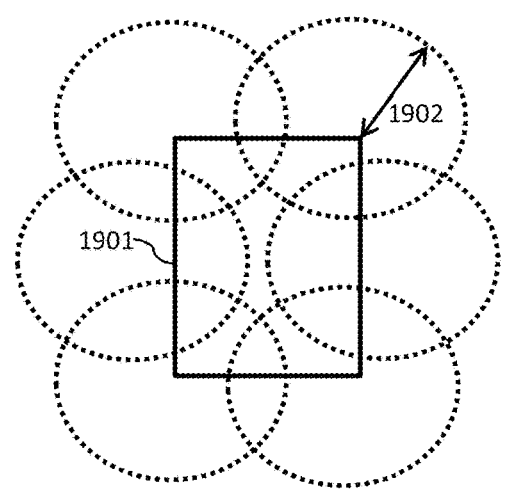

FIG. 19 shows a position of the sensor with respect to the tubes for the configurations shown in FIGS. 18A to 18D. The sensor position (indicated by dotted circles in FIG. 19) will be everywhere inside a 15 m radius (reference sign 1902) from all the edges of the tube group (reference sign 1901), as shown in FIG. 19.

Figure 20:
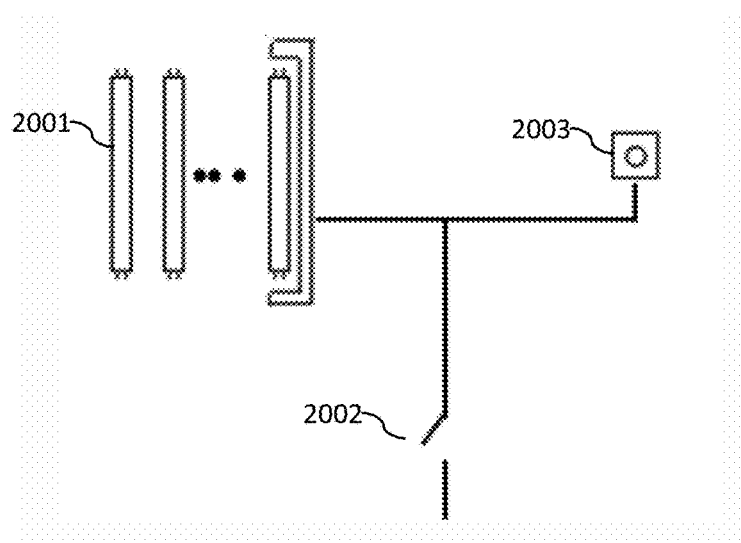

FIG. 20 shows a test setup for the test configurations shown in FIGS. 18A to 18D. The setup comprises, in particular comprises of, one sensor 2003, the luminaires with the tubes 2001, and one switch 2002. The electrical connection is schematically shown in FIG. 20 (the tubes can be inserted or removed from the luminaires).

Network Congestion Measurement ("Node Pile" of Maximum 50 Tubes):

In the following, a network congestion measurement ("node pile" of maximum 50 tubes) is described in detail. This test process applies if a confined application space requires the tubes to be placed really close to each other. This test proves the network handling capability when the tubes are very close to each other (<0.5 m). The test is conducted by forming a network with a sensor and a group of maximum 50 tubes and the functionality and latency is judged. Throughout the test, the daylight threshold setting on the potentiometer is preferably be at the right most value. The sensor is preferably enclosed in a four-walled box (bottom side is on the table and upper ceiling is on air) so that the only way for the presence sensor to be activated is to pass something on top of the box with a move that can be recognized by the sensor. Also the open ceiling allows the artificial light of the room to pass through and get captured by the daylight sensing element on the sensor. The test process is as follows:
1. Adjust the time delay setting value to the most left position (To ensure that the tubes will dim-down after the test quickly and allow the test to be conducted in a shorter time).
2. Adjust the daylight threshold setting on the sensor at the right most value.
3. Put the sensor in the four-walled box.
4. Place the nodes in such a way that all nodes between each other and between the sensor have at maximum 0.5 m of distance.
5. Electrify the factory default tubes (practically this is not possible so we have to use 1 tube and the rest can be factory default dummy ZigBee child nodes).
6. Electrify the sensor.
7. LONG press the sensor push button to enter pairing mode. Result: all nodes preferably pair with the sensor and receive a dim-down (from the tubes) visual feedback.
8. Trigger the presence sensor by passing an object above the box with the open ceiling. Result: The tube is dimmed-up (Assuming that the light passing through to the sensor is not too much).
9. Evaluate and judge the functionality and latency of the network. Register if all nodes received the dim-up command.

The lighting system may further comprise a so-called OFF feature. The OFF feature described in this section may be an addition to the system functionality. The OFF feature may be disabled by default (the user can enable it on-site from the sensor UI). The system described in this document is preferably a dimmable system with the intent of energy saving in case of lack of human/warmth presence. In case the user wants to save even more energy, there should be the option available for the user to shut down (dim-off to stand-by) the tubes after some time. This extra functionality is described in terms of bullet points below:
  The OFF function will be implemented (but will be disabled by default)
  When the tubes are dimmed to 20%, the dim-up/threshold/decision-making functionality is as already implemented when presence is detected.
  When the tubes are off and presence is detected, the sensor takes a dim-up decision depending on the threshold potentiometer and daylight sensing: If sensed light is less than the threshold the tubes go from "off" to 100%, if sensed light is more than threshold the tubes goes from off to 20% (which may be actually the same as when the tubes do not go off).
  When tubes are at 20% or 100% and presence is not sensed anymore, the tubes stay at 20% or 100% until the timer counts up to the time delay potentiometer setting, and then after that they go (or stay) to 20%. If the OFF mode is disabled (default) the tubes stay at 20%, if the OFF mode is enabled a counter counts up to 15 minutes and then tubes turn off. The 15 min time slot may be fixed time for when the OFF setting is enabled. However, any other time slot may also be valid.
  The OFF mode toggles between enabled and disabled by using 4 times (4×) short press of the sensor button. By default, the OFF mode is disabled, but if the user short presses the sensor button 4 times, OFF mode is enabled. If the user presses the sensor button again 4 times, OFF mode is disabled again and so on.

The feedback to the user on whether the OFF mode is enabled or disabled is as following: when the OFF setting is disabled and the user enables it, the tubes turn off for 2 seconds and then turn on again and stay to 20% or 100% (just like after testing mode); when the OFF setting is enabled and the user disables it, the tubes blink twice (with the same blink timing as in test mode but only twice) and then stay ON (just like after testing mode and in this case the twice blink timing is also like in testing mode).

The network destruction initiated by sensor command will be changed from 5 times short press to 10 times short press. In this way, we push far away the number of short presses for the network destruction so as to avoid the user trying to toggle enabling of the OFF setting and accidentally destroying the network! (For example we want to avoid: if we keep the network destruction at 5 times and we use the 4 times for the OFF toggle, then if the user wants to toggle the OFF setting and by mistake presses the button once more then the network is destroyed!)

In summary, the "Off feature" comprises:
  2× short press=Test
  4× short press=toggle OFF setting enabled or disabled (disabled by default)
  10× short press=destroy network.

Additionally, during pairing mode of the sensor, the test function and the OFF feature toggling may be disabled. In this way, the tube pairing feedback of the tubes is not disturbed by the tube test blinking or the OFF feature blinking.

Test Checklists:

The conduction of the tests is preferably done by all combinations of tube types and sensor types. In particular, all sensors are tested with all tubes. Even though the sensor design is very similar in all types as well as the design of the tubes is very similar between the different tube types, some minor electrical or mechanical modification between the versions of the tubes or the sensor types, can have an effect in the normal and wireless functionality.

As shown in the following table, both 4 ft and 5 ft tubes preferably go through the whole test process described above in combination with all three (SENSOR ST8 CR, SENSOR ST8 RT and SENSOR ST8 HB) sensor types as shown below:

| SENSOR ST8 CR | tubes T8 4 ft |
| | tubes T8 5 ft |
| SENSOR ST8 RT | tubes T8 4 ft |
| | tubes T8 5 ft |
| SENSOR ST8 HB | tubes T8 4 ft |
| | tubes T8 5 ft |

During the conduction of the tests the results and comments are documented on checklists. The checklists include rows with the title of the test, the scenarios where this test can apply to a real situation, a result PASS/FAIL and a comment on the test result.

The checklist for the network related tests is as follows:
Sensor network creation and automatically adding factory default tubes
Testing the network presence and tube population
Network group destruction initiated by sensor
Tube joining existing sensor network
Group of tubes joining existing sensor network Tubes losing sensor network (sensor is defect or unreachable)

Tube disconnection from sensor.

The checklist for the normal operation related tests is as follows:

Normal presence detection at three time delay (hold-off) settings

Normal presence detection at normal room light and three daylight settings

Range measurement between sensor and one tube in open air (1 m, 5 m, 10 m, 20 m, 30 m)

Range measurement between sensor and two tail tubes in open air (1 m, 5 m, 10 m, 15 m between sensor2tube and tube2tube)

Range measurement of matrix setup of sensor and 8 tubes (1 m, 5 m, 10 m)

Network full—load measurement (50 tubes)

Network congestion measurement ("node pile" of maximum 50 tubes)

The test procedures are time-demanding and may include lots of details. The existence of different kinds of sensors and tubes make it even more complex and bulky. It lies in the experience of the tester to skip some tests, the results of which will be identical or very similar to others.

In the following, exemplary embodiments of the lighting system and exemplary embodiments of a method for operating the lighting system will be described in a general context having reference to different applications of the lighting system. The individual method steps may be interchanged and/or are not mandatory.

Commissioning Step (Pairing):

By pairing, it is meant that a light source client joins a wireless network entity that is created by the sensing element. After a light source is paired to the sensing element, it is not able to pair in any other network until it unpairs to the previously joined network. A network entity can only be created from the master sensing element. Both the sensing element and the light sources come in two network-related modes: normal (or operational) mode and pairing mode. The normal mode represents the sense-act mode and will be described later. The pairing mode represents a mode where the system elements are "open" and able to connect or pair with each other. A sensing element can pair with multiple light sources but not with another sensing element. A light source can pair only to one sensing element but not to another light source. The network capability can, though, use the light sources to relay messages from the sensing element to the light source and vice versa to enable mesh functionality.

From the sensing element's point of view, to enable pairing mode, the user may apply "long press" or similar distinguishable function for a time range between 1 second and 10 seconds (in this specific implementation, the long press refers to at least 4 seconds). This switches the sensing element's mode from normal mode to pairing mode. It is possible to switch the sensing element back to normal mode by applying the same long press. If not, then, the sensing element can stay at this mode for a specific amount of time ranging from 1 minute to 1 hour. After that, the pairing mode time expires and the sensing element returns back to normal mode (in this specific implementation the pairing time window expires in 50 minutes).

From the light sources point of view the pairing window can be either enabled by using a long press of the user interface button between a time range of 1 second to 10 seconds, and then either expire automatically after a time range of 1 minute to 1 hour or get out of pairing mode by applying the same long pressing again. If the light source is unpaired and turned on, it automatically enables pairing mode before the pairing time window expires. (In this application, the long press of the light sources button is fixed to 4 seconds).

Pairing One-by-One:

During the commissioning process, the pairing between the sensing element and the light sources can happen in two ways: all at once and one by one. In the one by one process, every light source's pairing time window is opened when all other light sources' pairing time window is closed. At this point the pairing between this light source and the sensing element takes place. Then sequentially the light sources' pairing windows turn on one by one and they pair with the sensing element until all of the light sources in the group are successfully paired. In this specific application, the pairing window of the light sources open either when the light source is in factory default (reset) status and they turn on (the window stays open for 10 seconds-15 seconds) or immediately after when the light source is reset using the user interface and again it lasts for 10 seconds to 15 seconds.

Pairing all at Once:

The other commissioning process involves pairing of the light sources with the sensing element all at once. In this way, all light sources' pairing time windows open at the same time and the sensing element sequentially serves all the pairing requests. In this type, the pairing windows from all side should be sufficiently long enough for the sensing element's processing unit to finish pairing with all light sources.

User Feedback after Pairing:

After the pairing attempt between the sensing element and the light sources, the user should get feedback on whether the light source is paired with the sensing element. In this case, the light source will indicate to the user using its light output that the pairing is successful. In this application, the light source will blink once.

System Population Testing:

After successful commissioning or for system maintenance, the system preferably is tested for network population. This means that the user may check whether all the required light sources have successfully paired with the sensing element and joined its network. The validation of the network population is given in terms of a light feedback to the user from the light sources. The testing mode is activated through the sensing elements' user interface by using 1 to 10 times "short press". Then the light sources will start blinking for a time between 1 second and 1 minute with a time space between the ON and OFF status of the light source between 1 second and 5 seconds. The blinking can also occur between every dim state and not only with 0% (OFF) and 100% (ON). In this application, the testing mode is activated and deactivated by "short pressing" the sensing element's button 2 times. Then the light sources blink by turning ON for 1 second and then OFF for another one. The duration of this testing mode lasts for 1 minute. The user can either wait for 1 minute until the testing mode expires, or deactivate the testing mode by using the same user interface sequence that activates it.

In the following, exemplary embodiments for an operation in normal mode will be described.

Feature Enable-Disable:

In this system it is also possible to enable or disable some features again by using the user interface of the sensing element. The user can use the "short press" for 1 time to 10 times to enable or disable a feature. The user feedback on whether the feature is enabled or disabled is given by the light sources' light output in terms of alternating the light status. This alternating status can have any dimming level and last from 0.5 second to 5 seconds for every dimming level and alternate any number of times.

Off Feature:

In this application one feature is implemented, and thus the OFF feature. As explained above, by default the normal operation may require that the light sources stay on a dimmed level "A" during sensing and then after sensing input is gone, light sources get a command from the sensing element to transfer to a dimmed status "B" and stay there until the next sensing input. If the OFF feature is enabled, the light sources count a time between 1 second and 24 hours and then they go down to a dimmed status "C" where the light source output is zero. This means that there will be no light output coming out of the light sources and they operate on standby power (only for the wireless communication). In this application, the OFF feature is enabled/disabled by "short pressing" the sensing element button 4 times. The user feedback is given as such:

OFF enable: Light sources switch OFF for 2 seconds (they operate in standby power for these 2 seconds)

OFF feature disable: Light sources blink 2 times for 1 seconds each.

Network Reset

After commissioning of the network, when a modification or a partial or total dismantling of the network may be required, the user may apply this change through the user interfaces of the sensing element or the light sources.

Light Source Network Removal:

When a light source shall be removed as a logic entity from the network, this can be done again by using the user interface of the light source. By using the "long press" for a time range from 1 second to 10 seconds on the light source user interface, the light source is released from the network created by the sensing element. The light source is then giving optical feedback to the user about the successful removal from the network. The removal of the light source from the network does not affect any other light sources in a functional manner (in the background, the other light sources may change some network handling specific data or routing tables).

In this application, the light source's button may require to be pressed for at least 4 seconds and the user feedback given upon successful removal is just once flashing of the light source. After removal of the light source from the sensing element's network, the pairing time window of the light source opens up again for 10-15 seconds.

Sensing Element Network Destruction:

When the sensing element is needed to exit the current network, then since the current network was created by it and handled by it, upon removal of the sensing element from the network, the sensing element also makes sure that all light sources connected/paired to it will also be removed. In this case, instead of calling the unpairing of the sensing element from the network, "network removal", this action can also be called "network destruction" since the network will not exist anymore. The network destruction from the sensing element will happen by "short pressing" the sensing element's user interface for 1 time up to 10 times. After that the sensing element forces the light sources to give out some optical feedback with a dimming status from 0% to 100% or an alternating pattern with time delays between 1 second to 10 seconds or even a simple flashing of one or more times. In a specific application, the sensing element resets and destroys the network by 10 times short pressing of the button on it.

Security Features:

The system provides additionally some security features, called so because the system behavior changes depending on the physical status of the system. For example, there is the possibility for the system to be self-aware regarding the physical operation or not of the individual parts that form the system (light sources and sensing elements) and change or optimize its behavior depending on what part is malfunctioning or not functioning at all and act accordingly.

In this specific system, there is a security feature implemented that changes the light output intensity of the light sources depending on whether the sensing element is powered and functioning or it is damaged and not communicating with the light sources. Since the light sources and the sensing element are exchanging status messages, the individual parts of the system are aware of the physical status of each other and can alter their behavior depending on that. The security feature characteristic of this system is apparent when the light sources are dimmed to a low level because of lack of presence sensed from the sensing element. If at that moment, the sensing element stops being operational or gets out of range for some reason, then after some time the light sources become aware of this fact and dim up to full intensity. This is done in real cases to avoid having low light intensity in the case of a broken sensing element that is not able to sense any presence any more even though there exists.

The invention is not restricted by the description based on the embodiments. Rather, the invention comprises any new feature and also any combination of features, including in particular any combination of features in the patent claims, even if this feature or this combination itself is not explicitly specified in the patent claims or exemplary embodiments.

The invention claimed is:

1. A lighting system comprising:
   at least one light source;
   a sensor, wherein the sensor:
      is adapted for creating and/or expanding a wireless network between the sensor and the at least one light source;
      is adapted to operate in at least one of the following operating modes including a sensing mode, a pairing mode, a testing mode, and a network destruction mode; and
      comprises a commissioning button for switching between operating modes, in particular between the sensing mode and the pairing mode and/or between the sensing mode and the testing mode and/or between the sensing mode and the network destruction mode; and
   a wireless control module for establishing the creation and/or expansion of the wireless network.

2. The lighting system according to claim 1, wherein the at least one light source of the wireless network is exclusively connected to the sensor.

3. The lighting system according to claim 1, wherein the wireless network is based on a Bluetooth technology, Thread, Wi-Fi, ZigBee, and/or a low-power wireless technology.

4. The lighting system according to claim 1, wherein the sensor comprises at least one sensor transducer which is a movement and/or a presence and/or a daylight transducer.

5. The lighting system according to claim 1, wherein the at least one light source comprises a second wireless control module, wherein the second wireless control module of the at least one light source is adapted for communicating with the wireless control module of the sensor.

6. The lighting system according to claim 5, wherein the at least one light source further comprises a second commissioning button, wherein the second commissioning button is adapted to pair the at least one light source to the wireless network and/or reset the wireless network and/or remove the at least one light source from the wireless network.

\* \* \* \* \*